(12) United States Patent
Vacanti et al.

(10) Patent No.: US 10,914,830 B2
(45) Date of Patent: Feb. 9, 2021

(54) DIGITAL ACTIVE PHASED ARRAY RADAR

(71) Applicant: Honeywell International Inc., Morris Plains, NJ (US)

(72) Inventors: David C. Vacanti, Renton, WA (US); Marc M. Pos, Duvall, WA (US)

(73) Assignee: Honeywell International Inc., Charlotte, NC (US)

( * ) Notice: Subject to any disclaimer, the term of this patent is extended or adjusted under 35 U.S.C. 154(b) by 450 days.

(21) Appl. No.: 15/888,173

(22) Filed: Feb. 5, 2018

(65) Prior Publication Data

US 2019/0113610 A1 Apr. 18, 2019

Related U.S. Application Data

(60) Provisional application No. 62/571,604, filed on Oct. 12, 2017.

(51) Int. Cl.
| | |
|---|---|
| *G01S 13/58* | (2006.01) |
| *G01S 7/35* | (2006.01) |
| *G01S 7/282* | (2006.01) |
| *G01S 7/02* | (2006.01) |
| *G01S 13/02* | (2006.01) |

(52) U.S. Cl.
CPC ............ *G01S 13/583* (2013.01); *G01S 7/282* (2013.01); *G01S 7/352* (2013.01); *G01S 2007/028* (2013.01); *G01S 2013/0245* (2013.01); *G01S 2013/0254* (2013.01)

(58) Field of Classification Search
CPC ........ G01S 13/583; G01S 7/282; G01S 7/352; G01S 2013/0245; G01S 2007/028; G01S 2013/0254

USPC .......................................... 342/103, 70, 175
See application file for complete search history.

(56) References Cited

U.S. PATENT DOCUMENTS

| | | |
|---|---|---|
| 4,845,506 A | 7/1989 | Shibata et al. |
| 7,023,374 B2 | 4/2006 | Jossef et al. |
| | (Continued) | |

FOREIGN PATENT DOCUMENTS

| | | |
|---|---|---|
| EP | 2857857 A1 | 4/2015 |
| WO | 2017073644 A1 | 5/2017 |

OTHER PUBLICATIONS

Extended Search Report from counterpart European Application No. 18199747.9, dated Mar. 21, 2019, 7 pp.

(Continued)

*Primary Examiner* — Bo Fan
(74) *Attorney, Agent, or Firm* — Shumaker & Sieffert, P.A.

(57) ABSTRACT

In some examples, a radar system includes phase-locked loop (PLL) circuitry configured to generate a control voltage signal and processing circuitry configured to generate a reference signal to drive the PLL circuitry to generate the control voltage signal. In some examples, the radar system also includes voltage-controlled oscillator (VCO) circuitry configured to generate radio-frequency (RF) signals based on the control voltage signal and one or more antennas configured to transmit the RF signals and receive returned RF signals. In some examples, the radar system further includes receiver circuitry configured to generate intermediate-frequency (IF) signals based on the returned RF signals, wherein the processing circuitry is further configured to detect an object based on the IF signals.

20 Claims, 12 Drawing Sheets

(56) References Cited

U.S. PATENT DOCUMENTS

| | | | |
|---|---|---|---|
| 7,737,880 B2* | 6/2010 | Vacanti | G01S 7/023 342/100 |
| 8,274,426 B2* | 9/2012 | Lee | G01S 5/0289 342/125 |
| 8,659,472 B2* | 2/2014 | Sai | H03L 7/185 342/124 |
| 9,417,315 B2 | 8/2016 | Palmer et al. | |
| 2013/0147657 A1* | 6/2013 | Lee | G01S 7/032 342/175 |
| 2016/0223665 A1* | 8/2016 | Winstead | G01S 13/582 |
| 2016/0245913 A1 | 8/2016 | Park et al. | |
| 2017/0104276 A1 | 4/2017 | Vacanti et al. | |
| 2017/0160389 A1 | 6/2017 | Vacanti | |
| 2017/0346169 A1 | 11/2017 | Wang | |

OTHER PUBLICATIONS

Response to Extended Search Report dated Mar. 21, 2019, from counterpart European Application No. 18199747.9, filed Oct. 15, 2019, 9 pp.

"DRU III OEM Directional RADAR Unit," Kustom Signals, Inc., accessed from www.kustomsignals.com on Jul. 7, 2017, 2 pp.

"Differential Input, Dual, Simultaneous Sampling, 5 MSPS, 12-Bit, SAR ADC," Analog Devices, AD7356, Feb. 23, 2017, 21 pp.

"4-Channel, 24 Ghz, Receiver Downconverter," Analog Devices, ADF5904, Feb. 23, 2017, 16 pp.

"18 GHz Microwave PLL Synthesizer," Analog Devices, ADF 41020, Feb. 23, 2017, 17 pp.

"MMIC VCO w/ Half Frequency Output & Divide-By-16, 23.8-26.8 GHz," Analog Devices, HMC739LP4/739LP4E, Feb. 23, 2017, 7 pp.

"GaAs MMIC I/Q Mixer 24-28 Ghz," Analog Devices, HMC1063LP3E, Feb. 23, 2017, 15 pp.

"14-Bit, 65Msps/40Msps/25Msps Low Power Octal ADCs," Linear Technology, accessed from www.linear.com/LTM9008-14 on Oct. 4, 2017, 38 pp.

"Zynq-7000 All Programmable SoC," ZYNQ Product Brief, XILINX All Programmable, accessed from www.xilinx.com on Jun. 8, 2017, 4 pp.

"Zynq-7000 Programmable SoC Family Product Tables and Product Selection Guide," accessed from www.xilinx.com on Jun. 8, 2017, 11 pp.

U.S. Appl. No. 15/474,804, naming inventors Vacanti et al., filed Mar. 30, 2017.

U.S. Appl. No. 15/677,844, naming inventors Vacanti et al., filed Aug. 15, 2017.

U.S. Appl. No. 15/808,135, naming inventors Goossen et al., filed Nov. 9, 2017.

* cited by examiner

DIGITAL ACTIVE PHASED ARRAY RADAR

This application claims the benefit of U.S. Provisional Patent Application No. 62/571,604 (filed Oct. 12, 2017), which is incorporated by reference herein.

TECHNICAL FIELD

This disclosure relates to radar.

BACKGROUND

Radar systems may be used by aircraft, ground installations or other vehicles to detect weather, aircraft or other objects in the surrounding space. In smaller aircraft, such as some unmanned aerial vehicles (UAVs), weight, size, and power requirements may constrain the design of the radar system or preclude the use of a radar system altogether. For example, a small vehicle may include a battery power supply, so a radar system with high power consumption may rapidly deplete the energy stored in the battery.

SUMMARY

This disclosure describes a radar system configured to detect an object based on returned radio-frequency (RF) signals. The radar system may include processing circuitry that is configured to drive phase-locked loop (PLL) circuitry. The radar system may also include voltage-controlled oscillator (VCO) circuitry configured to generate RF signals based on a control voltage signal generated by the PLL circuitry. The radar system may further include antennas configured to transmit and receive RF signals. Receiver circuitry may be configured to generate intermediate-frequency (IF) signals based on the returned RF signals.

In some examples, a radar system includes PLL circuitry configured to generate a control voltage signal and processing circuitry configured to generate a reference signal to drive the PLL circuitry to generate the control voltage signal. The radar system also includes VCO circuitry configured to generate RF signals based on the control voltage signal and one or more antennas configured to transmit the RF signals and receive returned RF signals. The radar system further includes receiver circuitry configured to generate IF signals based on the returned RF signals, wherein the processing circuitry is further configured to detect an object based on the IF signals.

In some examples, a method includes driving, at processing circuitry, PLL circuitry to generate a control voltage signal and generating, at VCO circuitry, RF signals based on the control voltage signal. The method also includes transmitting, at one or more antennas, the RF signals and receiving, at the one or more antennas, returned RF signals. The method further includes generating, at receiver circuitry, IF signals based on the returned RF signals and detecting, at the processing circuitry, an object based on the IF signals.

In some examples, a radar system includes PLL circuitry configured to generate a control voltage signal and processing circuitry configured to drive the PLL circuitry to generate the control voltage signal. The radar system also includes VCO circuitry configured to generate RF signals in a continuous wave mode based on the control voltage signal and one or more transmit antennas configured to transmit the RF signals. The radar system further includes a local oscillator (LO) configured to generate an LO signal based on the RF signals, a coupler configured to deliver the RF signals to the one or more transmit antennas and to the LO, and four quadrants of receive antennas configured to receive returned RF signals. The radar system includes four mixers configured to generate IF signals based on the returned RF signals and based on the LO signal, four IF amplifiers configured to filter the IF signals, and four analog-to-digital converters configured to generate digital signals based on the filtered IF signals, wherein the processing circuitry is further configured to detect an object based on the digital signals.

DETAILED DESCRIPTION

Figure 1:
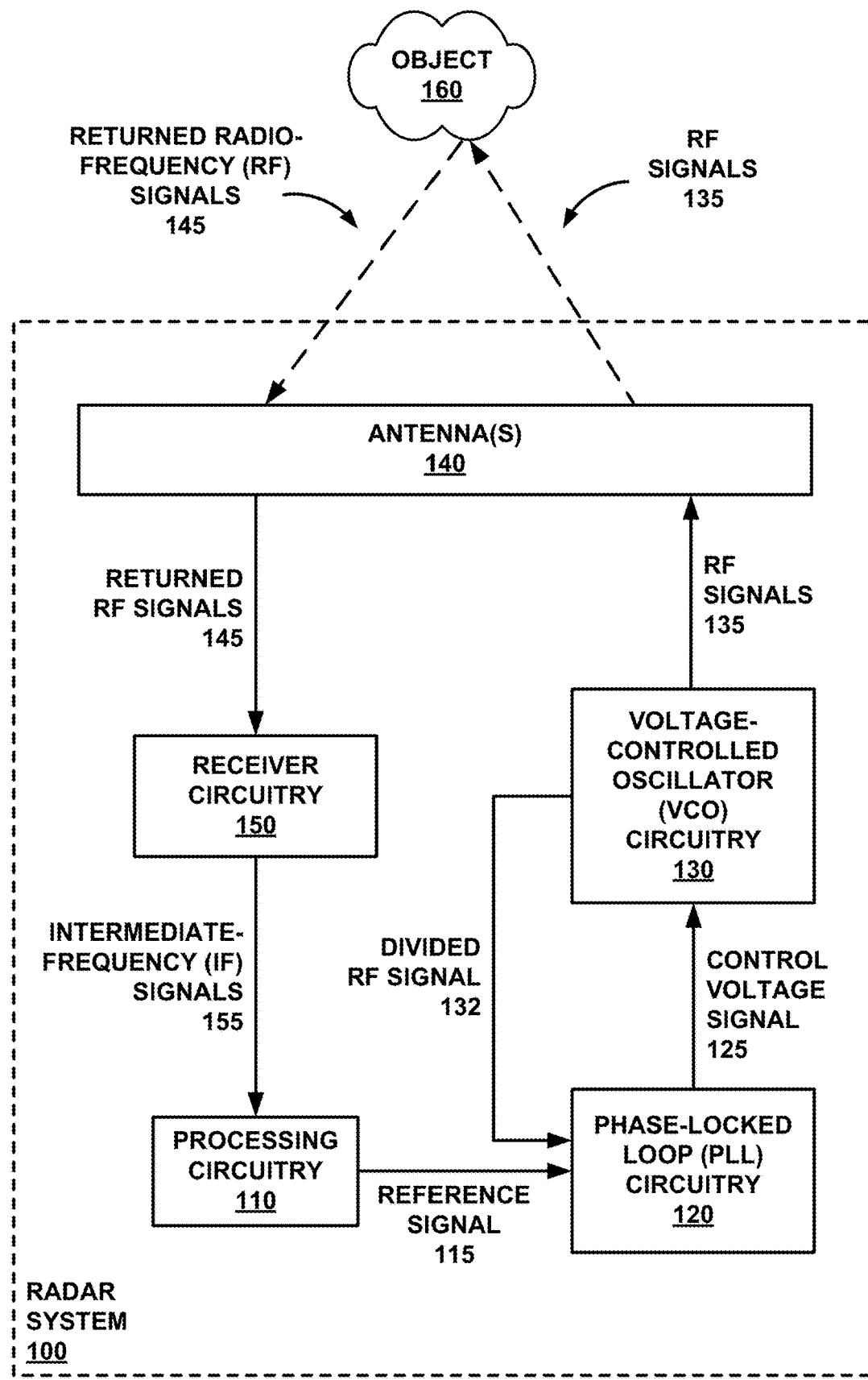
FIG. 1 is a conceptual block diagram depicting a radar system configured to detect an object based on returned radio-frequency (RF) signals, in accordance with some examples of this disclosure.

This disclosure is directed to systems, devices, and methods for a radar system including processing circuitry configured to drive phase-locked loop (PLL) circuitry to cause voltage-controlled oscillator (VCO) circuitry to generate RF signals for transmission. The radar system may further include antennas configured to transmit and receive the RF signals. The radar system may also include receiver circuitry that is configured to generate intermediate-frequency (IF) signals based on the returned RF signals. The processing circuitry may be further configured to detect objects based on the IF signals.

The radar system that may include fewer and/or simpler components than existing radar systems. The radar system may include common processing circuitry for both transmission and receive functions. The radar system may include a small form factor, low mass, and low power consumption. As a result, the radar system may be used in small vehicles, inexpensive vehicles, and/or mass-market vehicles. However, the techniques of this disclosure are applicable not only to small and/or low-cost radar systems, but also to larger, heavier, and higher-cost radar systems.

To accommodate the small form factor, the radar system may be configured to operate at higher frequencies, such as the K band between eighteen and twenty-seven gigahertz. Higher frequencies may translate into smaller antenna(s) because of the shorter wavelengths. By operating in only one frequency band, the radar system may include simpler circuitry and fewer components, as compared to existing radar systems that can operate in two or more frequency band.

Land vehicles such as automobiles and unmanned aerial vehicles (UAV) may benefit from sensors that assist with navigation and obstacle avoidance. A radar system of this disclosure may provide an independent sense-and-avoid (SAA) solution. The radar system may be useful in automotive applications such as adaptive cruise control, obstacle monitoring and avoidance, autonomous operation, and so on. Although other radar systems are available, a radar system of this disclosure may have a relatively small form factor and may meet low-cost targets for mass production. A radar system of this disclosure, which may be referred to as a digital active phased-array (DAPA) ultra lite radar system, may be used in consumer electronics and other mass market devices such as automobiles and small UAV's.

The autonomous automotive and UAV markets are growing exponentially. The radar system described herein may be used in ultra-light applications and may fit those growing market needs. In addition to the hardware innovations described herein, the radar-system platform may also be configured to run SAA algorithms. The radar system may provide a low-cost software-defined radar system because objects are detected by processing circuitry based on returned RF signals. The radar system may also include develop and license tracking and sensor-fusion software. In some examples, the radar system described herein may cost about two hundred and fifty dollars to produce. This radar system has multiple applications for small unmanned vehicles on the ground, in the air, in space, or in marine applications.

FIG. 1 is a conceptual block diagram depicting a radar system 100 configured to detect an object 160 based on returned radio-frequency (RF) signals 145, in accordance with some examples of this disclosure. Radar system 100 may be configured to mount on a vehicle, such as an aerial vehicle, a land vehicle, or a marine vehicle. Radar system 100 may be built on a single circuit board such as a printed circuit board (PCB). Antenna(s) 140 may be positioned on one side of the PCB, and the remaining components may be mounted on the other side of the PCB.

The total volume of radar system 100 may be approximately twelve centimeters by approximately five centimeters by approximately one centimeter. The total volume of radar system 100 may be approximately the size of a smartphone. The total power dissipation of radar system 100 may be approximately ten watts during operation. The total mass of radar system 100 may approximately one kilogram or less.

Processing circuitry 110 may be configured to generate reference signal 115 to drive PLL circuitry to generate control voltage signal 125. Processing circuitry 110 may generate and deliver reference signal 115 as a frequency chirp to PLL circuitry 120. Processing circuitry 110 may be configured to generate reference signal 115 that is similar to the output of a direct digital synthesizer (DDS). Reference signal 115 may be a linearly changing reference signal that PLL circuitry 120 receives at the clock reference input of PLL circuitry 120. As compared to an existing radar system with a DDS that drives a PLL, radar system 100 may have fewer components by not needing a specific DDS chip. In addition, an existing radar system may include other components that are associated with the DDS chip. Radar system 100 may include a small form factor because processing circuitry 110 can drive PLL circuitry 120 and process the return signals.

Processing circuitry 110 may also be configured to generate a variable clock signal for PLL circuitry 120 in order to set the frequency of RF signals 135 through PLL circuitry 120 and VCO circuitry 130. Thus, processing circuitry 110 may operate similar to a direct digital synthesizer (DDS). In some examples, processing circuitry 110 may include a multiprocessor system on a chip. Processing circuitry 110 may be combination of a digital signal processor (DSP) with a field-programmable gate array (FPGA) fabric. One example of processing circuitry 110 is the Zynq 7000 series made by Xilinx, Inc. of San Jose, Calif.

Processing circuitry 110 may be configured to receive IF signals 155 from receiver circuitry 150. In some examples, radar system 100 may include one or more analog-to-digital converters (ADC's) configured to convert returned RF signals 145 or IF signals 155 to digital signals. In some examples, the one or more ADC's may be integrated into processing circuitry 110. Processing circuitry 110 may be configured to process the digital signals to determine the location and/or velocity of object 160. Processing circuitry 110 may form beams based on the returned RF signals 145 and IF signals 155.

Processing circuitry 110 may determine the location of object 160 based on a beam focused on object 160. Processing circuitry 110 may use digital-beam-forming techniques such as complex weighting based on phase shifts and/or amplitude shifts. Processing circuitry 110 may be configured to determine a velocity of object 160 based on a shift in the frequency of returned RF signals 145 from the frequency of RF signals 135 (e.g., the Doppler frequency). Processing circuitry 110 may create a three-dimensional representation of the space around radar system 100.

Processing circuitry 110 may be configured to generate an output in response to detecting object 160. For example, processing circuitry 110 may generate the output by generating an alert such as audio alert or visual alert to the operator of the ownship vehicle. In some examples, processing circuitry 110 may cause the ownship vehicle to conduct an evasive maneuver, such as a braking maneuver, a stopping maneuver, a landing maneuver, a quick turn, and/or a change in direction in order to avoid a threat. Processing circuitry 110 may also be configured to store the location and/or velocity of object 160 to a memory device. Processing circuitry 110, or a separate SAA system, may be configured to track the position of object 160 over time. For example, processing circuitry 110 may determine the velocity of object 160 relative to the ownship vehicle in order to determine the imminence of a collision between object 160 and the ownship vehicle.

PLL circuitry 120 may be configured to generate control voltage signal 125 based on reference signal 115 and/or divided RF signal 132. PLL circuitry 120 may be configured to generate control voltage signal 125 in integer mode by multiplying the frequency of reference signal 115 and comparing the frequency of the multiplied signal with the frequency of divided RF signal 132. PLL circuitry 120 may be configured to generate control voltage signal 125 to drive the tuning circuit of VCO circuitry 130. The output frequency of VCO circuitry 130 (e.g., RF signals 135) may be directly proportional to the amplitude of control voltage signal 125. The relationship between the amplitude of control voltage signal 125 and the frequency of RF signals 135 may be non-linear. Hence, a closed-loop PLL circuitry 120 may achieve a desired exact operating frequency of RF signals 135 and the desired exact modulation. PLL circuitry 120 may be configured to determine the swept bandwidth of RF signals 135 and the time of the sweep using linear frequency-modulated (FM) modulation.

Control voltage signal 125 may cause VCO circuitry 130 to generate a K-band RF signal (e.g., RF signals 135) that is monitored and controlled by PLL circuitry 120. VCO circuitry 130 may be configured to provide a sample of the output frequency divided by two (e.g., divided RF signal 132), such that the 24-gigahertz (GHz) signal (e.g., RF signals 135) is reduced to 12 GHz (e.g., divided RF signal 132), so that PLL circuitry 120 can receive divided RF signal 132 as a direct input. PLL circuitry 120 may be configured to compare a reference clock signal from processing circuitry 110 and divided RF signal 132 from VCO circuitry 130 to determine control voltage signal 125. An example of PLL circuitry 120 is the ADF41020 made by Analog Devices, Inc. of Norwood, Mass. PLL circuitry 120 may be configured to cause VCO circuitry 130 to generate RF signals 135 as a continuous wave, such as a frequency-modulated continuous wave (FMCW). In some examples, radar system 100 may be configured to operate in a continuous-wave mode and/or pulsed mode.

As stated above, processing circuitry 110 may be configured to generate reference signal 115 at a frequency that processing circuitry 110 can change linearly over time. PLL circuitry 120 may be configured to multiply the frequency of reference signal 115 by a fixed integer value, rather than operating in a fractional mode. Control voltage signal 125 has a voltage amplitude that PLL circuitry 120 may deliver to VCO circuitry 130 to achieve the desired final output frequency of RF signals 135. VCO circuitry 130 may be configured to provide a sample of the output millimeter-wave (MMW) K-Band frequency (e.g., the frequency of RF signals 135) that has a frequency that is half of the output frequency. For example, if the frequency of RF signals 135 is 24 GHz, VCO circuitry 130 may be configured to divide the frequency of RF signals 135 by two to 12 GHz and send divided RF signal 132 to PLL circuitry 120.

Thus, reference signal 115 may be a sinusoidal waveform, and processing circuitry 110 can adjust the frequency of reference signal 115. PLL circuitry 120 may be configured to generate control voltage signal 125 as a voltage signal with an amplitude that is based on the frequency of reference signal 115. PLL circuitry 120 may be configured to use feedback from VCO circuitry 130 (e.g., divided RF signal 132) to compare to reference signal 115 from processing circuitry 110. PLL circuitry 120 may be configured to multiply the frequency of reference signal 115 by an integer before comparing reference signal 115 to divided RF signal 132.

For example, reference signal 115 may have a frequency of 128 MHz, and PLL circuitry 120 may be configured to multiply the frequency by 94 to generate a multiplied signal at 12.032 GHz. If processing circuitry 110 changes the frequency of reference signal 115 by just 1 MHz to 129 MHz, PLL circuitry 120 may generate a multiplied signal at 12.126 GHz, which is a change of 94 MHz from 12.032 GHz. PLL circuitry 120 may be configured to compare this signal to divided RF signal 132 in order to generate control voltage signal 125. As a result, a small change in clock frequency (e.g., of reference signal 115) may move the output (e.g., the amplitude of control voltage signal 125 and consequently the frequency of RF signals 135) by a large amount.

Processing circuitry 110 may also be configured to generate a small linear chirp that PLL circuitry 120 multiplies in order to compare with divided RF signal 132. VCO circuitry 130 may then be configured to create a chirp at approximately 24 GHz that sweeps a range of nearly 200 MHz in some examples. It may be desirable to avoid using any fraction of frequency in PLL circuitry 120 because fractional mode may introduce spurious frequencies (e.g., sideband frequencies). Therefore, it may be desirable to use PLL circuitry 120 in integer mode and use other means such as a DDS or processing circuitry 110 to provide linear frequency modulation.

VCO circuitry 130 may be configured to generate RF signals 135 based on control voltage signal 125. VCO circuitry 130 may be configured to multiply the frequency of reference clock signal 111 (from 110) to arrive at the frequency of RF signals 135. For example, PLL circuitry 120 may be configured to multiply a reference clock signal (e.g., reference signal 115) of 128 MHz may be multiplied by a factor of 94 to reach a final output frequency of 12.032 GHz. The VCO output frequency (e.g., RF signals 135) may be exactly two times the frequency of the multiplied signal, or 24.064 GHz. VCO circuitry 130 may be configured to generate RF signals 135 in the K band of frequencies. VCO circuitry 130 may also be configured to generate a half-frequency output of RF signals 135. VCO circuitry 130 may be configured to deliver the divide-by-two signal (e.g., divided RF signal 132) to PLL circuitry 120 in order to generate control voltage signal 125. An example of VCO circuitry 130 is the HMC739 made by Analog Devices, Inc.

Antenna(s) 140 may be configured to transmit RF signals 135 and receive returned RF signals 145. In some examples, antenna(s) 140 may include an array of transmit antennas configured to transmit RF signals 135 as a single beam. The transmit antennas may transmit RF signals 135 in a continuous wave. Antenna(s) 140 may also include an array of receive antennas configured to receive returned RF signals 145. Radar system 100 may include a means for electrically isolating the transmit antennas and the receive antennas, such as an electronic bandgap (EBG) isolator.

Figure 3:
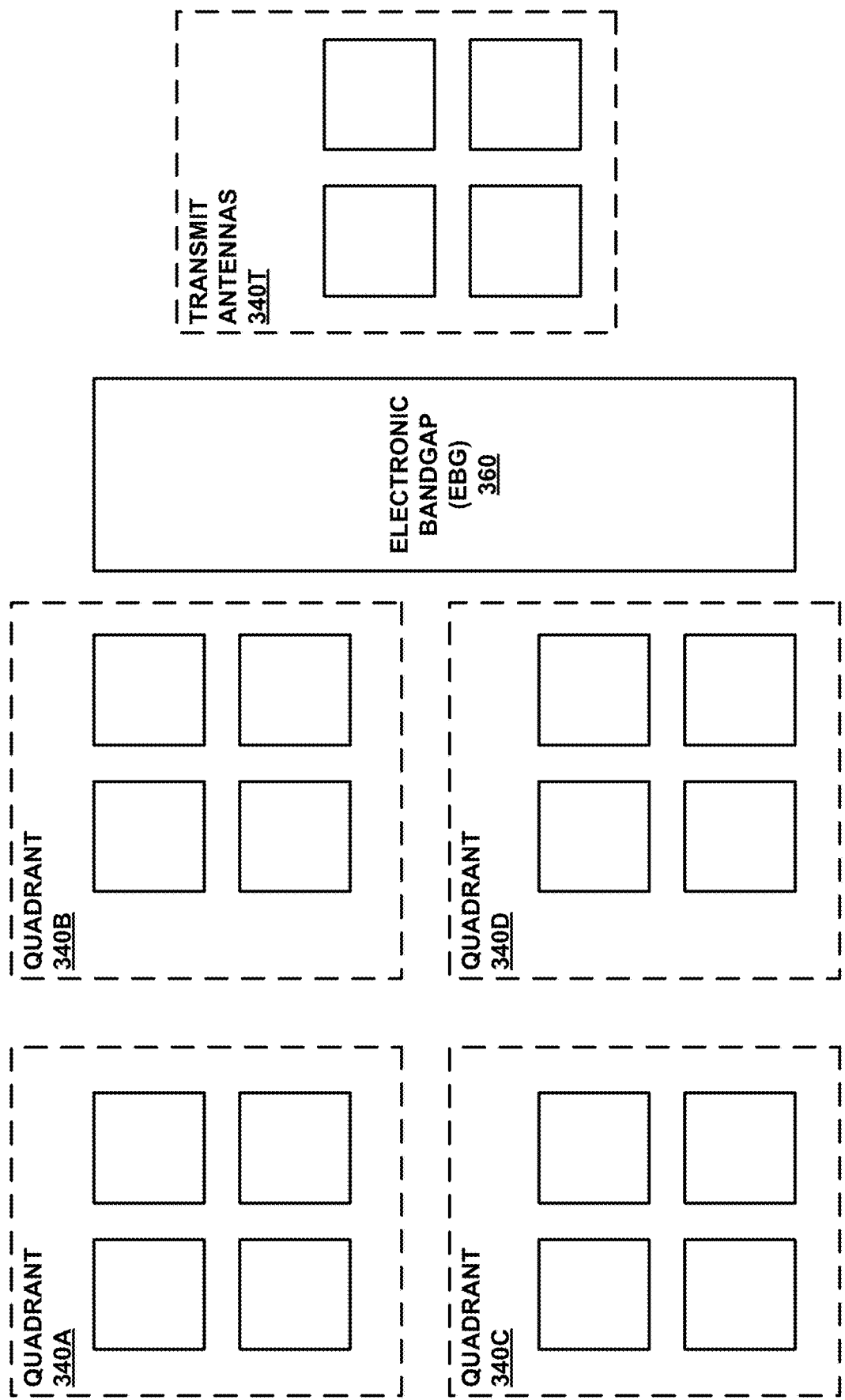
FIG. 3 is a conceptual block diagram depicting transmit antennas and receive antennas separated by an electronic bandgap (EBG), in accordance with some examples of this disclosure.

Antenna(s) 140 may include microstrip antenna(s) etched on a PCB. Antenna(s) 140 may be patch antenna(s) or discrete antenna(s). FIG. 3 illustrates an example configuration of antenna(s) 140, where the receive antennas are formed into four quadrants.

Receiver circuitry 150 may be configured to generate IF signals 155 based on returned RF signals 145. Receiver circuitry 150 may include one or more low-noise amplifiers (LNA's), mixers, IF amplifiers, and/or IF filters. Receiver circuitry 150 may include operational amplifiers for processing returned RF signals 145. Receiver circuitry 150 may also include one or more ADC's configured to convert returned RF signals 145 or IF signals 155 to digital signals for processing circuitry 110. An example of receiver circuitry 150 is the HMC1063, made by Analog Devices, Inc. The HMC1063 includes a single mixer configured to output quadrature I and Q IF signals 155, which may be useful in digital beam forming.

Object 160 may be any mobile object or remote object such as an aircraft such as a helicopter or a weather balloon, or object 160 may be a space vehicle such as a satellite or spaceship. In yet other examples, object 160 may include a land vehicle such as an automobile or a water vehicle such as a ship or a submarine. Object 160 may be a manned vehicle or an unmanned vehicle, such as a drone, a remote-control vehicle, a ballistic vehicle, or any suitable vehicle without any pilot or crew on board. In some examples, object 160 may or may not be configured to transmit surveillance signals, such as ADS-B, to inform the ownship vehicle (e.g., the vehicle carrying radar system 100) of the location and direction of travel of object 160. Object 160 may also be a weather balloon or an animal such as a bird. Object 160 may also be part of terrain (e.g., ground or body of water), a stationary object (e.g., a sign, a rock, or a tree), or a weather object (e.g., a water droplet).

In accordance with the techniques of this disclosure, the architecture of radar system 100 may be simpler and have fewer components than existing radar systems. The architecture may allow lower mass, cost, volume, and power consumption in some examples. In some examples, radar system 100 may include additional components for increased functionality. For example, FIG. 2 depicts radar system 200 as an example of a radar system with more components than radar system 100, such as memory device 212, coupler 232, and local oscillator (LO) 252.

Radar system 100 may have a lower cost than existing radar systems because the components of radar system 100 can be used in other radar systems. For example, receiver circuitry 150 may include similar components as the circuitry of a larger or higher cost radar system. Thus, the design costs and component costs may be lower because of volume discounts and shorter design times.

Figure 2:
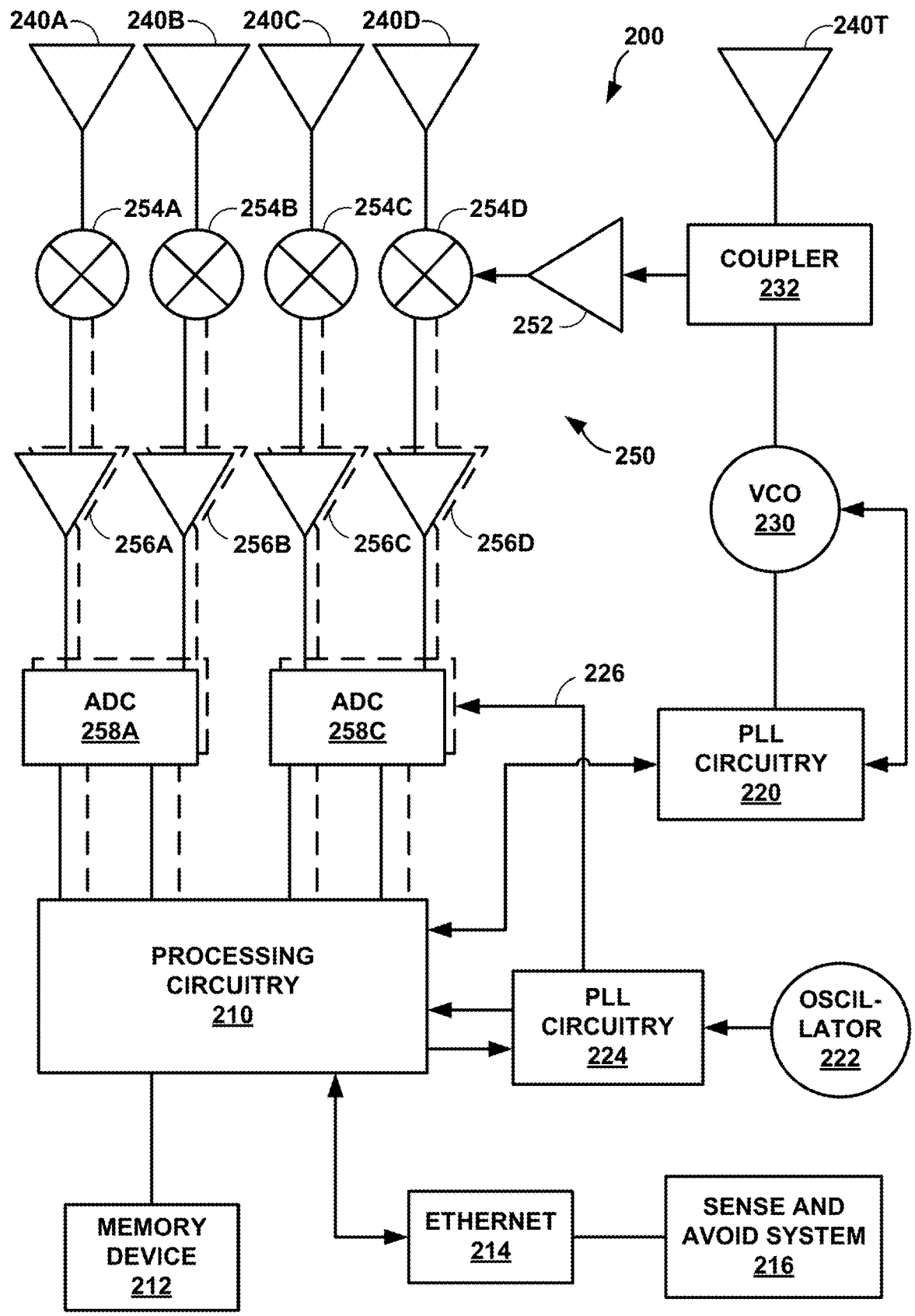
FIG. 2 is a conceptual block diagram depicting a radar system including four receive antennas configured to receive returned RF signals, in accordance with some examples of this disclosure.

FIG. 2 is a conceptual block diagram depicting a radar system 200 including four receive antennas 240A-240D configured to receive returned RF signals, in accordance with some examples of this disclosure. Radar system 200 is an example radar system with additional detail and components, such as memory device 212, ethernet connection 214, and SAA system 216.

Memory device 212 may include volatile memory and/or non-volatile memory. Memory device 212 may be configured to store data such as object characteristics. Memory device 212 may store locations and velocities of objects detected by processing circuitry 210. Processing circuitry 210 may be configured to transmit information relating to the detected objects by ethernet connection 214 to SAA system 216.

SAA system 216 may determine whether a detected object poses a threat to the ownship vehicle. SAA system 216, as known as detect-and-avoid system, may be further configured to cause the ownship vehicle to take an evasive maneuver if the detected object poses a threat. SAA system 216 may be a separate processor that controls the movement of a vehicle, or SAA system 216 may be integrated into processing circuitry 210. In some examples, radar system 200 may include a WiFi connection and/or a Bluetooth connection between processing circuitry 210 and SAA system 216. Processing circuitry 210 may use the WiFi connection or ethernet connection 214 to connect to other electronics. Processing circuitry 210 may use low-speed power over ethernet connection 214 on an edge connector to provide data and power Crystal oscillator 222 may be configured to operate as a master clock for radar system 200. For example, crystal oscillator 222 may deliver a one-hundred megahertz signal to PLL circuitry 224 and, in some examples, PLL circuitry 220. PLL circuitry 224 may be configured to increase the clock frequency for processing circuitry 210. Using a single master clock for all of the components of radar system 200 may ensure coherency for the operation of the components. PLL circuitry 224 may be further configured to generate and deliver a clock signal for ADC's 258A and 258C. In some examples, the frequency of the clock signal delivered to ADC's 258A and 258C may be five megahertz.

Coupler 232 may be configured to deliver the RF signals to transmit antenna 240T and LO 252. Coupler 232 may be a microstrip coupler on the surface of the PCB of radar system 200. LO 252 may be configured to deliver an LO signal to mixers 254A-254D of receiver circuitry 250 based on the RF signals. In some examples, receiver circuitry 250 may be configured to operate as a homodyne receiver. As a homodyne receiver, receiver circuitry 250 may include simpler circuitry than a super-heterodyne receiver.

Receive antennas 240A-240D may include four quadrants of receive antennas configured to receive the returned RF signals and deliver the returned RF signals to receiver circuitry 250. Receiver circuitry 250 includes mixers 254A-254D and IF amplifiers 256A-256D, which may also be known as IF filters. Each respective mixer and each respective IF amplifier may be part of a "channel" that delivers signals to processing circuitry 210 in order to form up to four beams. Mixers 254A-254D may be configured to receive the returned RF signals and generate IF signals based on the returned RF signals and an LO signal received from LO 252. Mixers 254A-254D may down-convert the returned RF signals by subtracting the LO frequency from the returned RF frequency.

Mixers 254A-254D may also generate an up-converted IF signal by adding the frequencies of the returned RF signals and the LO signal, but IF amplifiers 256A-256D may be configured to filter out the frequencies other than the down-converted frequency. IF amplifiers 256A-256D may be configured to filter the IF signals to produce filtered IF signals. The filtered IF signals may include the down-converted frequencies but not the up-converted frequencies. IF amplifiers 256A-256D may also be configured to provide a range "pre-compensation" filter or a high-pass filter (HPF) that can provide gain as a function of the frequency of the IF signals. The gain of amplifiers 256A-256D may be equal to the propagation losses in the particular application. For example, an HPF with 12 dB per octave high-pass response from 1 kHz to 2 MHz may work well for all detections of discrete targets. However, when radar system 200 operates as a radar altimeter, the compensation could be adjusted to be 6 dB per octave to match the expected range-squared variation in range loss in altimeter mode.

Each of mixers 254A-254D may be configured to handle one of the four receive channels. Each of mixers 254A-254D may be an I-Q quadrature mixer. The outputs of mixers 254A-254D (e.g., IF signals) may be quadrature representations of the incoming signals from receive antennas 240A-240D. Processing circuitry 210 may be configured to add together, or subtract, the quadrature outputs together with phase information.

ADC's 258A and 258C may be configured to convert analog signals such as the IF signals or the filtered IF signals to digital signals for processing by processing circuitry 210. ADC's 258A and 258C may also be configured to receive a data conversion clock signal from PLL circuitry 224 that may be designed to provide all clock and RF signals required in radar system 200 and provide fully coherent operation based on a single master clock reference. For example, eighty megahertz as a serial clock data conversion signal. An example of ADC's 258A and 258C are the Dual ADC AD7356 or Octal ADC Converter LTC9006 made by Analog Devices, Inc. The down-converted IF signals and the resulting digital signals may have a frequency that is low enough for processing circuitry 210 to process the digital signals. In contrast, the returned RF signals may have a frequency of approximately twenty-four gigahertz. Thus, the down-conversion process performed by receiver circuitry 250 may provide processing circuitry 210 with lower-frequency signals for easier processing.

Processing circuitry 210 may be configured to digitally and electronically form beams that are a combination of two or more beams or two or more channels shown in FIG. 2. For example, processing circuitry 210 may be configured to add two or more beams and/or subtract one or more beams from other beams. Processing circuitry 210 and/or mixers 254A-254D may be configured to form and move beams using addition and subtraction for purposes such as looking straight out for air-to-air targets, or straight down as an altimeter to locate a hill, a valley, a structure, or trees (e.g., for tree mapping). Processing circuitry 210 may be configured to perform electronically scanning in a conical shape or motion, a back and forth motion similar to windshield wipers, and/or any other motion or shape.

Radar system 200 may not include phase shifters or other hardware to form beams because processing circuitry 210 may electronically form and move beams. Processing circuitry 210 may be configured to receive digital signals from ADCs 258A and 258C that represent four independent quadrants. Processing circuitry 210 may be configured to sum or difference the digital signals. Processing circuitry 210 may also perform complex weighting to create multiple beams and steer the receive pattern, to measure doppler to detect targets coming towards or moving away from radar system 200. Processing circuitry 210 may also be configured to detect objects in azimuth and elevation. Processing circuitry 210 may be configured to steer one or more receive beams via complex weights applied to four quadrants of I and Q channels generated by mixers 254A-254D.

FIG. 3 is a conceptual block diagram depicting transmit antennas 340T and receive antennas 340A-340D separated by an electronic bandgap (EBG) 360, in accordance with some examples of this disclosure. As shown in FIG. 3, each of receive antennas 340A-340D may include four receive antennas arranged in a substantially square format (e.g., within ten or twenty degrees of an exactly square format). A substantially square format may include four antennas, where each antenna is within one centimeter of a square format. Transmit antennas 340T and receive antennas 340A-340D may take up most of the space on one side of a PCB, with the remaining components of the radar system mounted on the other side of the PCB.

Transmit antennas 340T may be configured to transmit a wide beam of RF signals. Alternatively, the transmit antennas may include just one patch antenna. In some examples, the transmitted beam may be approximately equal in azimuth and elevation. Processing circuitry may then be configured to form smaller beams on receive for detecting the location of objects within those beams. The total field of regard in azimuth may be forty-five degrees, and the total field of regard in elevation may be forty-five degrees.

EBG 360 may electrically isolate transmit antennas 340T from receive antennas 340A-340D. As a result, EBG 360 may eliminate or reduce the interference between transmit antennas 340T and receive antennas 340A-340D. When transmit antennas 340T are transmitting RF signals, the RF signals may not significantly interfere with the reception of returned RF signals by receive antennas 340A-340D because of EBG 360.

Figure 4:
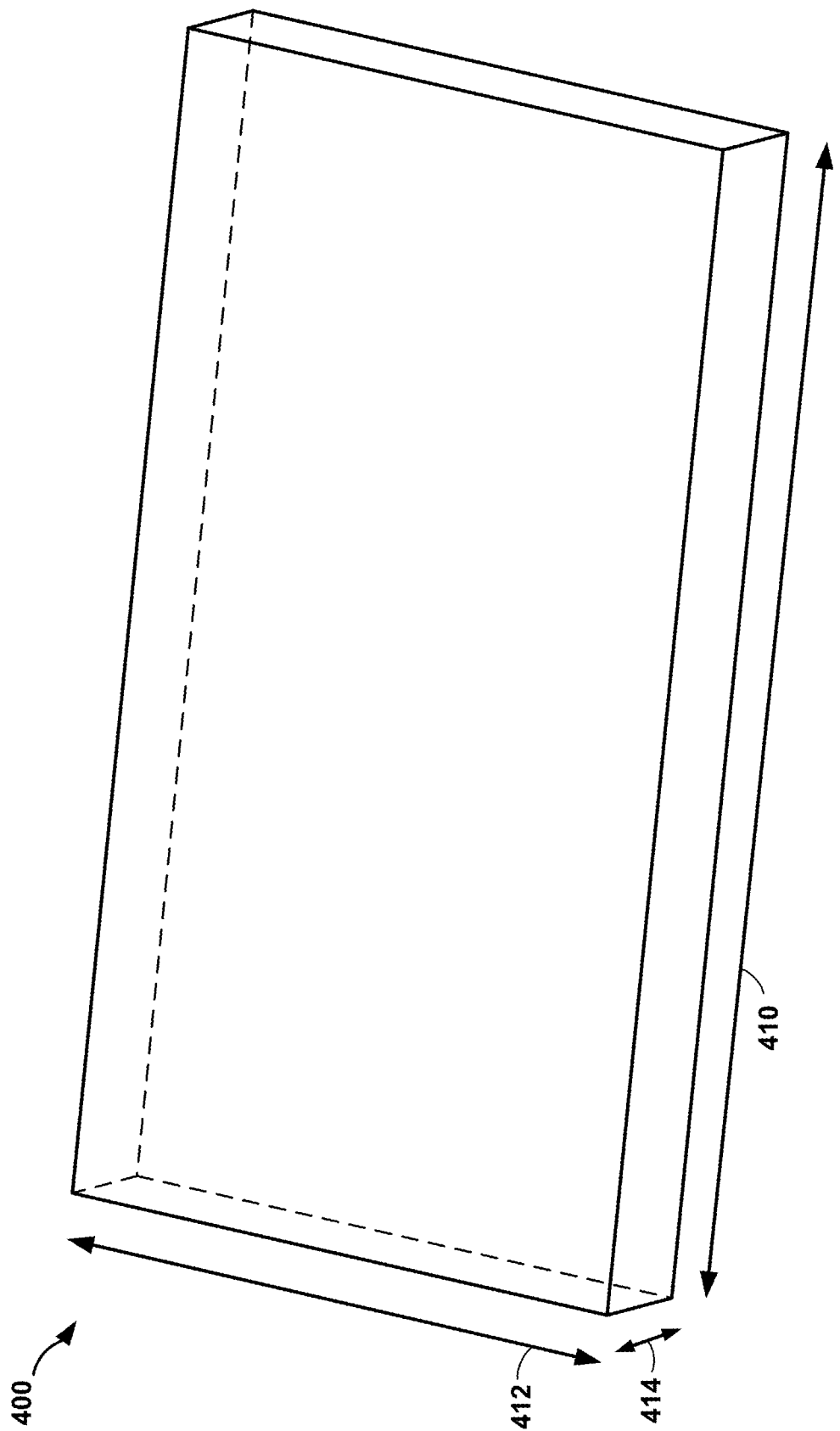
FIG. 4 depicts an example case for a radar system of this disclosure.

FIG. 4 depicts an example case 400 for a radar system of this disclosure. Case 400 may be the size of a small mobile phone. For example, dimension 410 may be five-and-one-half inches or fourteen centimeters. In some examples, dimension 410 may be less than twenty centimeters. Dimension 412 may be two-and-one-half inches or six centimeters. In some examples, dimension 412 may be less than ten centimeters. Dimension 414 may be one-third of an inch or one centimeter. In some examples, dimension 414 may be less than five centimeters. Case 400 may include printed plastic that is metalized for shielding inside. Case 400 may also include a one-eighth-inch power supply jack on one edge, similar to a mobile phone.

Figure 5:
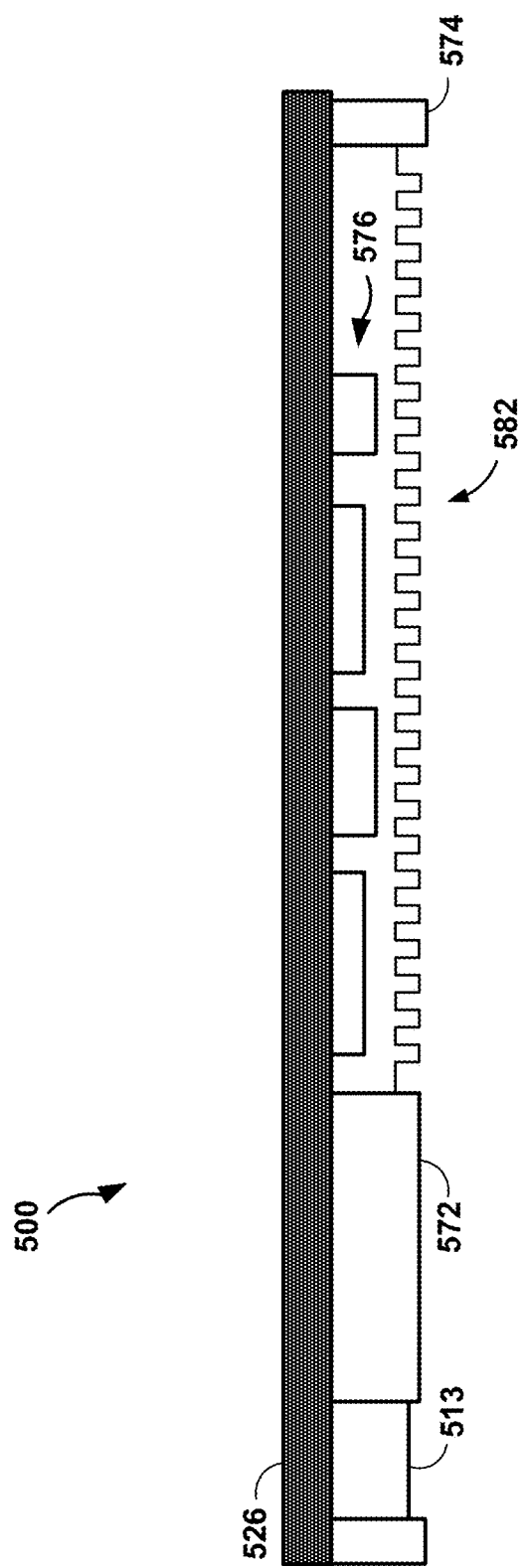
FIG. 5 depicts an example hardware configuration for a radar system of this disclosure.

FIG. 5 depicts an example hardware configuration for a radar system 500 of this disclosure. FIG. 5 depicts a side view of radar system 500 including housing 513, PCB 526, MIL circular connector 572, stand-off 574, cavity 576, and heat sink 582. FIG. 5 depicts one example construction of radar systems 100 and 200. PCB 526, which are inside housing 513, may include electrical connections for the components in cavity 576 and the transmit antenna array and the receive antenna array(s). PCB may include small metal shields that cover active circuitry to prevent internal coupling and noise. The top side of PCB 526 may include the antennas as microstrip, Substrate Integrated Waveguide antennas, Slot antennas, or other printed antennas. The bottom side of PCB 526 may include the radio-frequency circuitry, the core digital, and the power supply circuitry.

Housing 513 may cover most or all of radar system 500, such that the dimensions of housing 513 are approximately equal to the total dimensions of radar system 500. MIL circular connector 572 may include a mechanical element that is configured to mount on a vehicle frame. Stand-off 574 may be configured to protect the components in cavity 576 from damage. Cavity 576 may be positioned in the center of the chassis of radar system 500. Cavity 576 may have a thickness of five or six millimeters. Heat sink 582 may include ribs machined into the chassis of radar system 500. This system may also be packaged such that it can be directly integrated into an aircraft fuselage to provide weather protection or it may be carried externally on a small unmanned aerial system (e.g., a UAV).

Figure 6A:
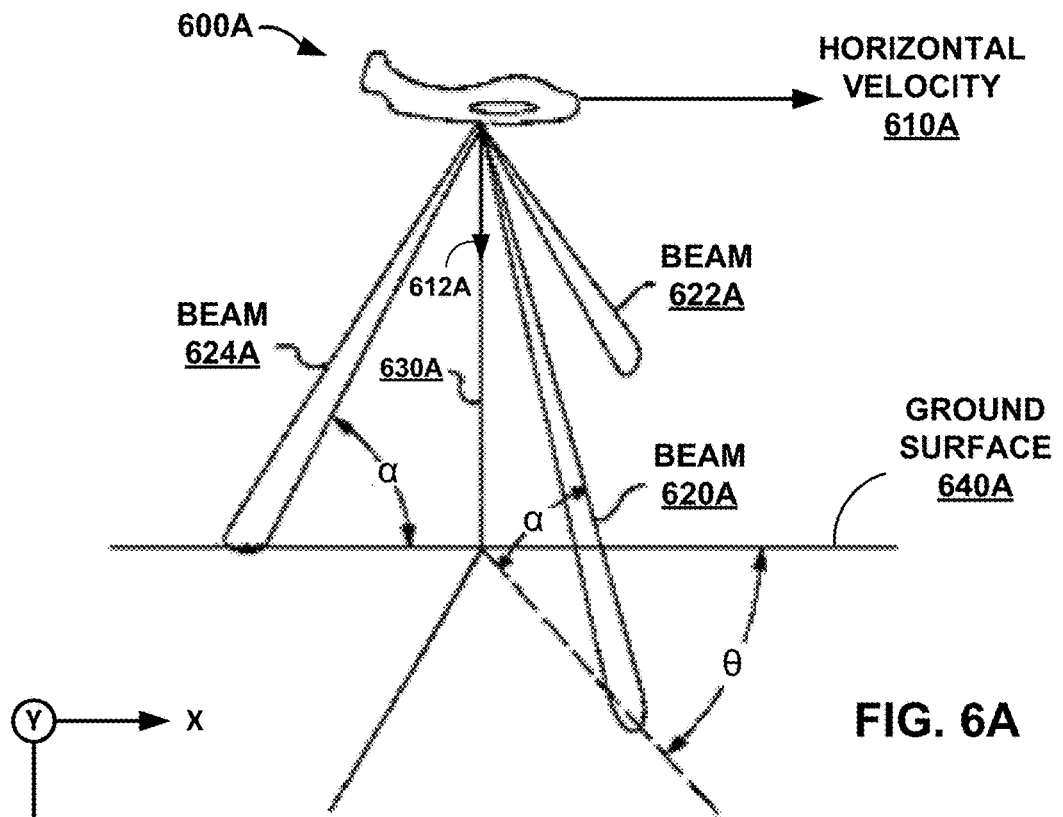
FIGS. 6A and 6B depict multiple-beam Doppler techniques, in accordance with some examples of this disclosure.
Figure 6B:
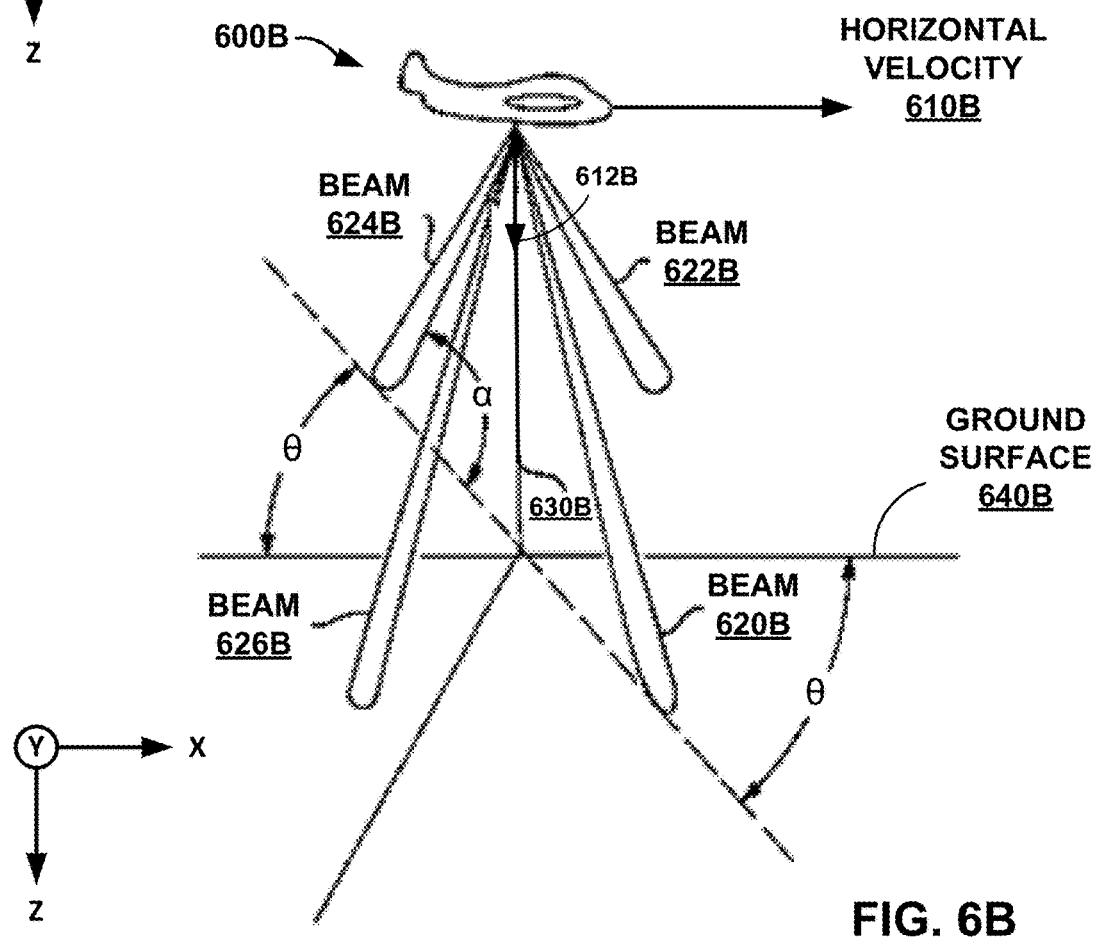

FIGS. 6A and 6B depict multiple-beam Doppler techniques, in accordance with some examples of this disclosure. FIG. 6A depicts the radar system onboard vehicle 600A transmitting three beams 620A, 622A, and 624A at different angles towards ground surface 640A. FIG. 6B depicts the radar system onboard vehicle 600A transmitting three beams 620B, 622B, 624B, and 626B at different angles towards ground surface 640B. Vehicles 600A and 600B may be travelling in the x-axis direction with horizontal velocities 610A and 610B while the radar system transmits RF signals towards ground surface 640A or 640B. The radar systems onboard vehicles 600A and 600B may be configured to determine altitudes 630A and 630B of vehicles 600A and 600B above ground surfaces 640A and 640B.

The radar system may be used as an SAA device, a radar altimeter, and/or a velocimeter with options to allow it to become a navigation sensor by measuring Doppler in four quadrants (e.g., northeast, southeast, southwest, and northwest). The four quadrants may not represent the actual direction of travel relative to latitude and longitude. In other words, the northeast quadrant may not be northeast on a compass. Instead, the northeast quadrant may be defined as ahead of and to the right of vehicle 600A, e.g., in the positive x-axis direction and the positive y-axis direction, and the southwest quadrant may be defined as behind and to the left of vehicle 600A. For example, the radar system may form beams 620B, 622B, 624B, and 626B in four quadrants. Therefore, movement in the x-axis direction or the y-axis direction can be used to measure velocity in each direction, similar to a four-beam Doppler navigator. The radar system may include simpler circuitry (e.g., fewer components) as compared to existing radar systems, so that the radar system of this disclosure may be a subset of a larger radar system.

The radar system may be configured to determine an estimated velocity of vehicle 600A or 600B based on the Doppler shift of at least two receive beams. The velocity of a vehicle may be correlated to the Doppler shift at K-band frequencies in the direction of each of the four beams. By measuring velocity in multiple directions, and starting from a known position (e.g., latitude and longitude), the radar system can determine the velocity of the vehicle and an updated position of the vehicle.

For example, the radar system can keep track of the direction of travel, which may be based on the net vector result of all four Doppler measurements, and the net velocity of travel. The net velocity of travel may be affected by wind, which may blow the system off course. Therefore, the radar system may determine the true position (e.g., latitude and longitude) based on the direction of travel and the net velocity of travel. This operation may be referred to as a "Doppler Navigator" mode. Doppler Navigator mode may be effective in dealing with Global Positioning System (GPS) jamming because the radar system can operate in a GPS-denied mode of operation. A small unmanned vehicle that is equipped with a "Doppler Navigator" mode may operate even when a GPS jammer impedes GPS navigation. The Doppler Navigator mode may work over water or flat terrain where other methods of terrain mapping may not be feasible. Doppler Navigator can be combined with terrain mapping navigation mode to provide verification of the accuracy of the Doppler Navigator. Doppler Navigator can be implemented in a three-beam mode, a four-beam mode, or with any other number of beams.

When operating as a Doppler Navigator, the radar system may be configured to use just two beams, but a configuration including three or more beams is more viable for navigation. However, two or more beams in altitude mode may be very useful for terrain navigation to determine an estimated altitude of nearby detailed features. The radar system may combine terrain mode and/or altitude mode with Doppler Navigator mode. When the radar system combines Doppler Navigator mode with terrain mapping (with detailed digital beam forming) and altimeter operation, the radar system may be valuable to small unmanned vehicles. If the vehicle also includes a second radar system configured to operate as a collision avoidance system, the two radar systems may offer autonomous navigation features including collision avoidance for full capability on a small unmanned vehicle.

The angles alpha α and theta θ refer to angles relative to the direction of flight of vehicles 600A and 600B (e.g., the positive x-axis direction). The angle theta may be measured to the side of the aircraft flight path, which may be the positive x-axis direction. If horizontal velocities 610A and 610B are pointing to the north, beams 620A and 620B may be in the northeast quadrant, beams 622A and 622B may be in the northwest quadrant, beams 624B may be in the southwest quadrant, beam 626B may be in the southeast quadrant, and beam 624A may be directed in the opposite direction of vehicle movement (e.g., the negative x-axis direction).

The angle alpha may be the look-down angle from the vehicles 600A and 600B, or the angle from each beam to ground surface 640A and 640B. The radar system may be configured to determine the final doppler frequency based on alpha, and the radar system may be further configured to determine the direction of the doppler signal based on theta. As a result, the northeast quadrant may be a front-right quadrant relative to the aircraft nose. Beams 620A and 620B may allow the radar system to measure horizontal velocity 610A and 610B in the northeast direction. Beams 620A and 620B may allow the radar system to measure horizontal velocity 610A and 610B in the northeast direction. Measuring velocities in all directions may permit the measurement of drift to the side of vehicles 600A and 600B or even moving backwards, which may be possible for certain vehicles such as quadcopters. All of the beams include a z-axis component, and the radar systems may use the beams to measure altitudes 630A and 630B and/or vertical velocities 612A and 612B.

The radar systems of vehicles 600A and 600B may digitally form the beams of FIGS. 6A and 6B on receive. The beams may be "squinted" due to the angle of the beams relative to the normal plane of the receive antennas. Four quadrants of receive antennas (quadrants 340A-340D shown in FIG. 3) are an example configuration of receive antennas that may form beams 620B-626B. The radar system may use the beams to measure Doppler shift due to the relative velocities of the ground surface and other objects. The four receive subarrays of antennas may be arranged to include a purposeful skew in the theta and alpha directions to provide a desired Doppler response in addition to a standard altimeter measurement.

The radar systems may also use the receive beams to determine locations to the left, right, front or back of a specific altitude measurement. Determining locations and objects offset from directly vertical (e.g., z-axis direction) allows a radar system to locate hills and other objects that the radar system can then index to a terrain map. The radar system may also be configured to navigate the vehicle. The radar system may be configured to receive azimuth scanning to map the terrain underneath the vehicle (e.g., terrain-aided navigation). Terrain-aided navigation includes mapping the ground surface underneath the vehicle and may use a stereo synthetic aperture radar (SAR) system.

In FIG. 6A, the processing circuitry may form beam 624A, which points aft from vehicle 600A, by combining two aft beams together in phase (see, e.g., beams 624B and 626B). The processing circuitry may be configured to leave the other two channels alone to operate independently as they were such that beams 620A and 622A represent independent beams from a quadrant of receive antennas. The processing circuitry may be configured to combine two of quadrants to form one beam (e.g., the beam 624A that is the back leg of the pattern. The processing circuitry may be configured to perform any number of other possible combinations to create other resultant beams.

For example, the processing circuitry may combine all four beams into a standard monopulse beam, or combine the two left beams into a single left beam and combine the two right beams into a single right beam. The processing circuitry may then be configured to subtract the single left beam and the single right beam to form an azimuth monopulse beam. The processing circuitry may be further configured to form a single forward beam and a single aft beam and subtract the beams to form an elevation monopulse beam. The processing circuitry may be configured to use the single monopulse beam (e.g., sum of all four) as a reference beam for the monopulse differences.

In addition, the processing circuitry and/or the mixers may be configured to apply a complex weight to some or all of the four beams to produce an I and Q output for each of the four beams. The processing circuitry and/or the mixers may be configured to weight the I and Q's, i.e., multiply each signal by another I and/or Q value, and the processing circuitry may apply an independent I and Q weight to each of the four beams. The processing circuitry may be configured to control the weighting and summing of the beams to cause a net beam to point in a direction. The processing circuitry may be configured to perform electronic beam steering by weighting each of the four channels and then summing the result of two or more channels. Therefore, the processing circuitry may be configured to cause a resultant beam to point off to the left, right, up, or down in order to steer the beam in any direction. The radar system may be configured to create one big transmit beam. On receive, the processing circuitry may apply complex weights to each of four beams to steer each independent beam and/or resultant beam to the left, right, forward, or aft to make measurements or locate object.

In some examples, the radar system may be configured to detect objects in an object detection mode and to determine an estimated altitude of the vehicle in an altimeter mode. The radar system may be configured to interleave the two modes or operate distinctly in each mode. The radar system may include a mechanical element to control the orientation of the antennas of the radar system. The mechanical element may be configured to position the antennas in a first orientation relative to the vehicle to detect objects and in a second orientation relative to the vehicle to determine an estimated altitude of the vehicle. The mechanical element may be configured to position the antennas in the second orientation by at least pointing the antennas at an angle that is approximately parallel to a direction of movement of the vehicle. The mechanical element may be configured to position the antennas in the first orientation by at least pointing the antennas towards the ground surface.

In some examples, the radar system may be a small, light-weight, high-resolution radar system. The radar system may include altimeter functionality by transmitting and/or receiving RF signals towards the ground surface. The radar system may include a pivoting mechanism configured to pivot the radar system from looking forward (i.e., horizontal or in the direction of travel of the vehicle) to looking downward. The pivoting mechanism may enable interleaving of SAA and altimeter functions for simultaneous or near-simultaneous SAA and altimeter functions. The pivoting mechanism may include a simple swivel or a gimbal mechanism.

The altimeter function may be useful in areas where high-resolution radar altimeters are required (e.g., mountainous terrain, low-flying vehicles, etc.). The altimeter function may be especially useful for aerial-photography UAV's, precision-terrain navigation for helicopters or airplanes, trains in tunnels, and other vehicles. The altimeter function may be useful for aerial-photography UAV's that need to maintain a specific altitude.

A commercial UAV may use a Global Navigation Satellite System (GNSS) (e.g., GPS) or an ultrasonic sensor for measurements of the height above ground for the UAV. The GPS measurements may not be very accurate in all circumstances. In addition, GPS may not operate properly indoors without line of sight to the satellites. Ultrasonic sensors may only be valid up to tenths of feet. The high-frequency radar system of this disclosure may provide extremely accurate measurements at several hundreds of feet of range. The radar system may even switch waveforms to increase range.

A high-resolution radar system with modern semiconductor technology may be small and light-weight. Given the possible small size of the radar system, a pivoting mechanism such as a gimbal, an A-track, planetary gears, and/or linear actuators may be configured to move the radar system from one position to another position. In some examples, the pivoting mechanism may be configured to move only the antennas and/or other components of the radar system. The radar system may be configured to switch waveforms and range compensation filtering in the IF circuitry to optimize the two functions (e.g., SAA and altimeter). For high-resolution and accuracy, the processing circuitry may be configured to modify the waveforms.

The radar system may also be configured to modulate the radar waveforms to communicate with a base station (e.g., a ground control station) or other vehicles. When operating in altimeter mode, the radar system could transmit waveforms as a backup communication link with the base station. When operating in SAA mode, the radar system could modulate the radar waveforms to communicate with other vehicles. The radar system may also be configured to provide additional SAA coverage by pivoting the radar system at large angles (e.g., one-hundred-and-eighty degrees) in the forward and aft directions. This pivoting may be especially useful for UAV's where distances may be relatively short because the pivoting mechanism can swing the radar system back and forth between positions.

Figure 7:
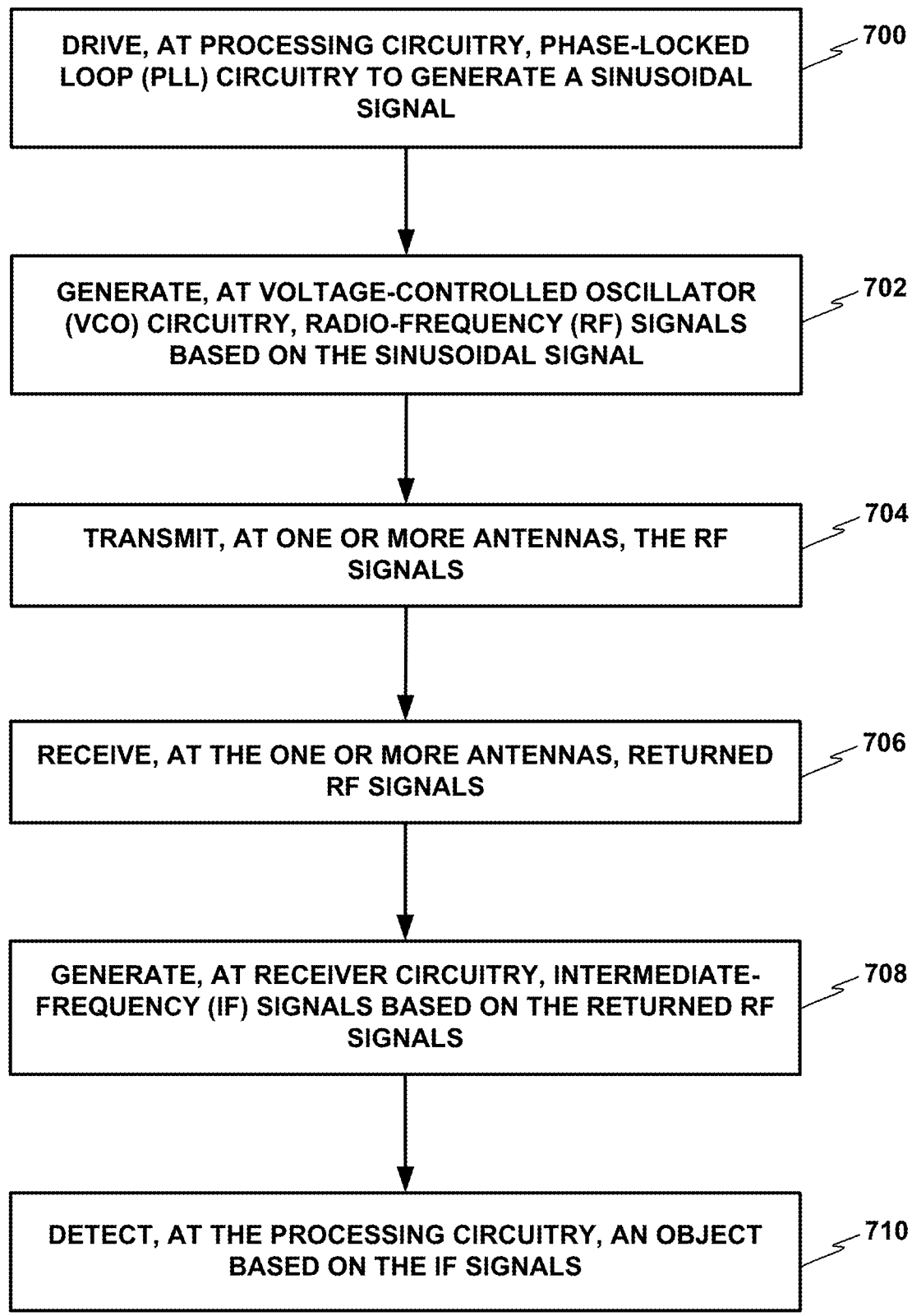
FIG. 7 shows a flowchart for example techniques for detecting an object based on returned RF signals, in accordance with some examples of this disclosure.

FIG. 7 shows a flowchart for example techniques for detecting an object based on returned RF signals, in accordance with some examples of this disclosure. The techniques are described with reference to radar system 100 of FIG. 1, although other components may perform similar techniques.

In the example of FIG. 7, processing circuitry 110 drives PLL circuitry 120 to generate control voltage signal 125 (700). Processing circuitry 110 may deliver a sinusoidal reference signal 115 to PLL circuitry 120 to cause PLL circuitry 120 to generate control voltage signal 125. PLL circuitry 120 may also be configured to generate control voltage signal 125 based on divided RF signal 132, which may be a waveform at one-half of the frequency of RF signals 135. In the example of FIG. 7, VCO circuitry 130 generates RF signals 135 based on control voltage signal 125 (702). RF signals 135 may have a frequency in the K or Ka band (i.e., from eighteen gigahertz to twenty-seven gigahertz or from 27 GHz to 40 GHz).

In the example of FIG. 7, antenna(s) 140 transmit RF signals 135 (704). In the example of FIG. 7, antenna(s) 140 receive returned RF signals 145 (706). The receive antennas and transmit antennas may be separated by an EBG that provides electrical isolation. The high frequencies of RF signals 135 and 145 may allow relatively small antenna. For example, at twenty-four gigahertz, a half-wavelength antenna is six or seven millimeters long. Thus, relatively high frequencies may allow smaller antennas and a smaller overall size for radar system 100.

In the example of FIG. 7, receiver circuitry 150 generates IF signals 155 based on returned RF signals 145 (708). Receiver circuitry 150 may be configured to down-convert returned RF signals 145 by subtracting the frequency of returned RF signals 145 from an LO signal that is based on the frequency of RF signals 135. In the example of FIG. 7, processing circuitry 110 detects object 160 based on IF signals 155 (710). Radar system 100 may include one or more ADC's configured to convert IF signals 155 to digital signals for processing.

Figure 8:
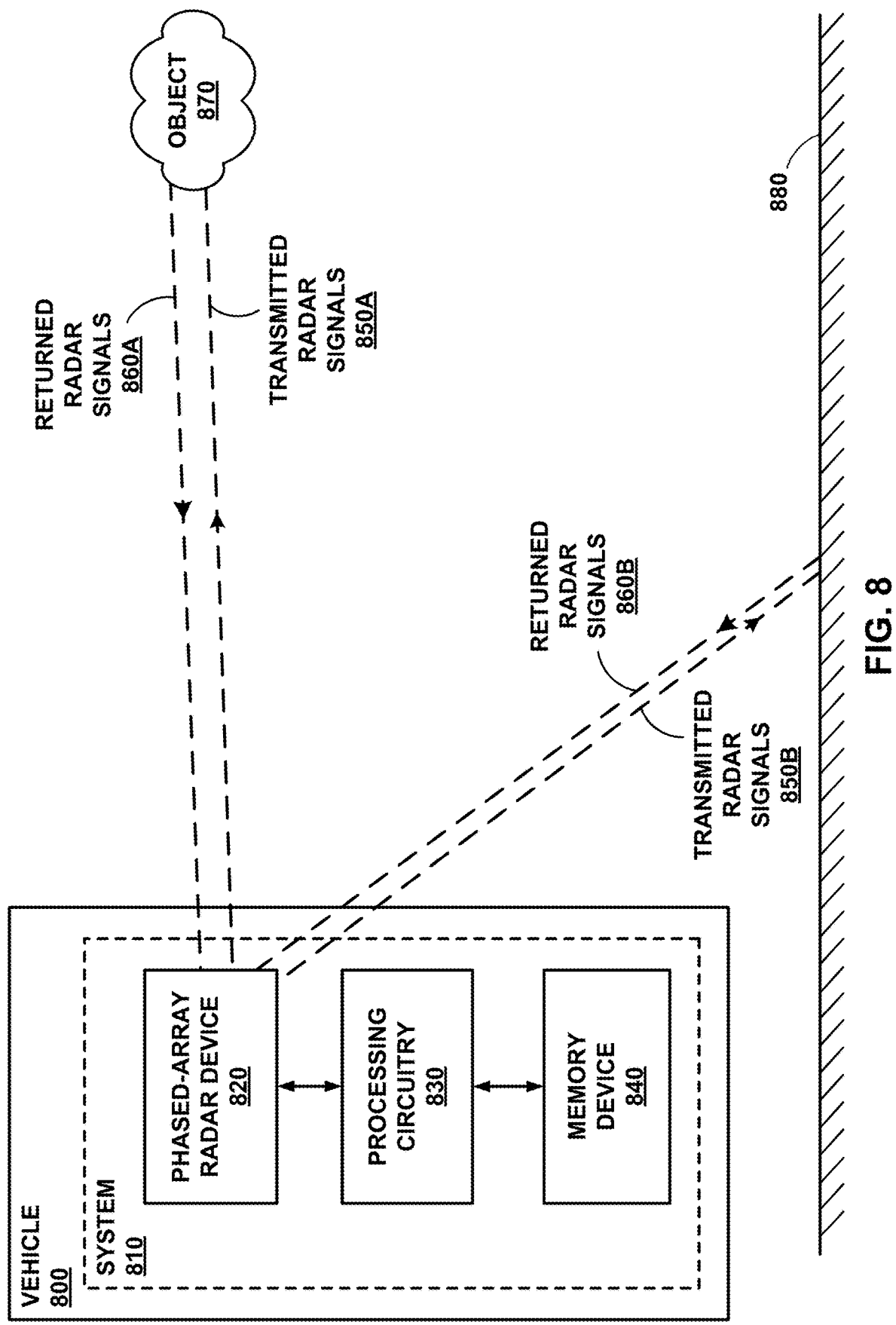
FIG. 8 is a conceptual block diagram depicting a system configured to detect an object and determine an estimated altitude, in accordance with some examples of this disclosure.

FIG. 8 is a conceptual block diagram depicting a system 800 configured to detect an object 870 and determine an estimated altitude, in accordance with some examples of this disclosure. In some examples, phased-array radar device 820 may include radar system 100, but phased-array radar device 820 may also include other radar systems. For example, phased-array radar device 820 may include any active electronically scanned array radar device or any passive electronically scanned array radar device.

Figure 9:
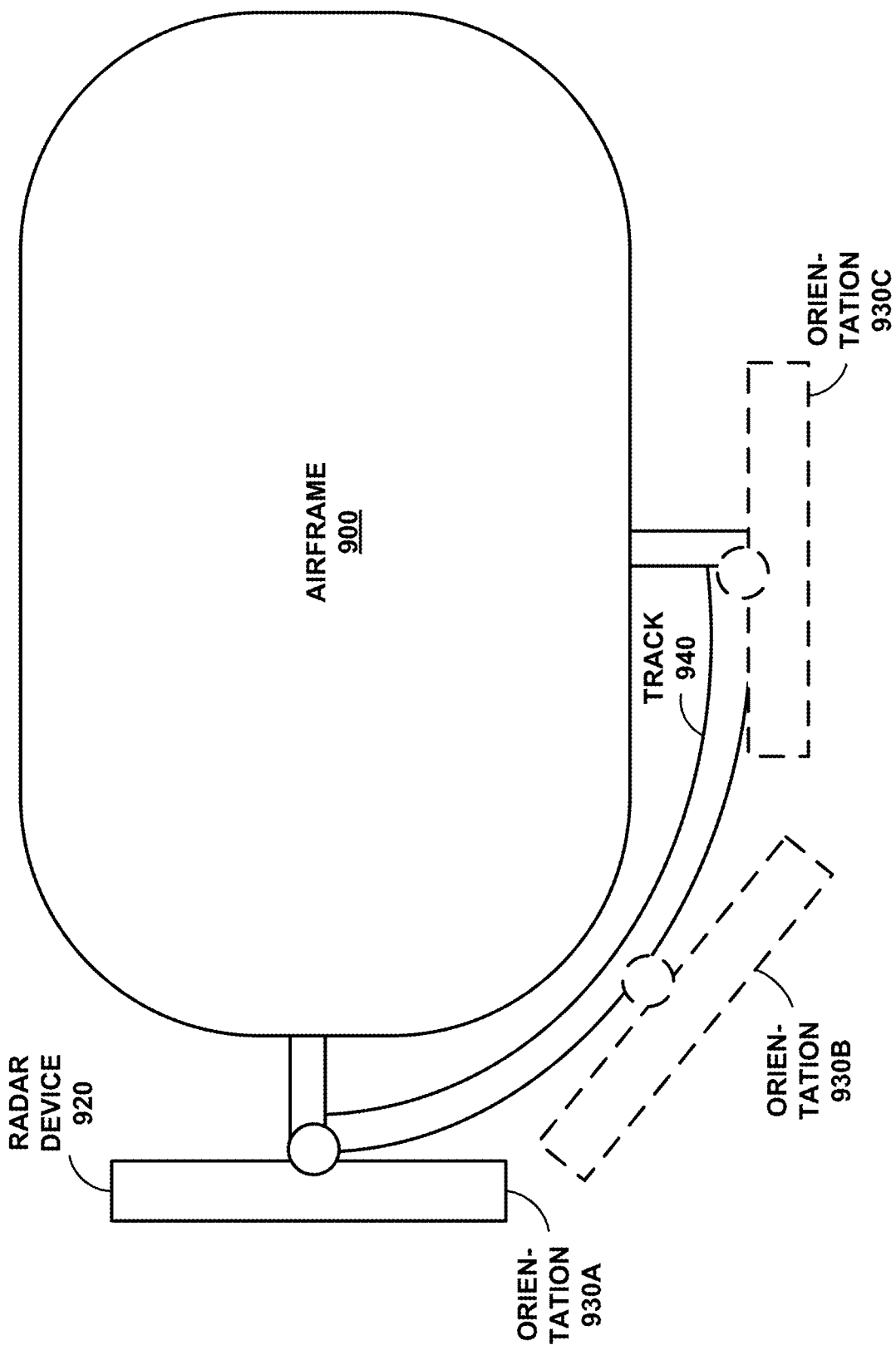
FIG. 9 is a conceptual block diagram depicting three orientations for a radar device, in accordance with some examples of this disclosure.

FIG. 9 is a conceptual block diagram depicting three orientations 930A-930C for a radar device 920, in accordance with some examples of this disclosure. Track 940 may be configured to position radar device 920 in orientation 930A to detect objects. When in orientation 930A, radar device 920 may be pointed at an angle that is approximately parallel to a direction of movement of airframe 900. Airframe 900 may be part of a vehicle. When in orientation 930A, radar device 920 may also be pointed at an angle that is approximately parallel to the ground surface.

Track 940 may be configured to position radar device 920 in orientation 930C to determine an estimated altitude of airframe 900. When in orientation 930C, radar device 920 may be pointed at an angle towards a ground surface. When in orientation 930B, radar device 920 may be able to detect objects and determine an estimated altitude of airframe 900.

Figure 10:
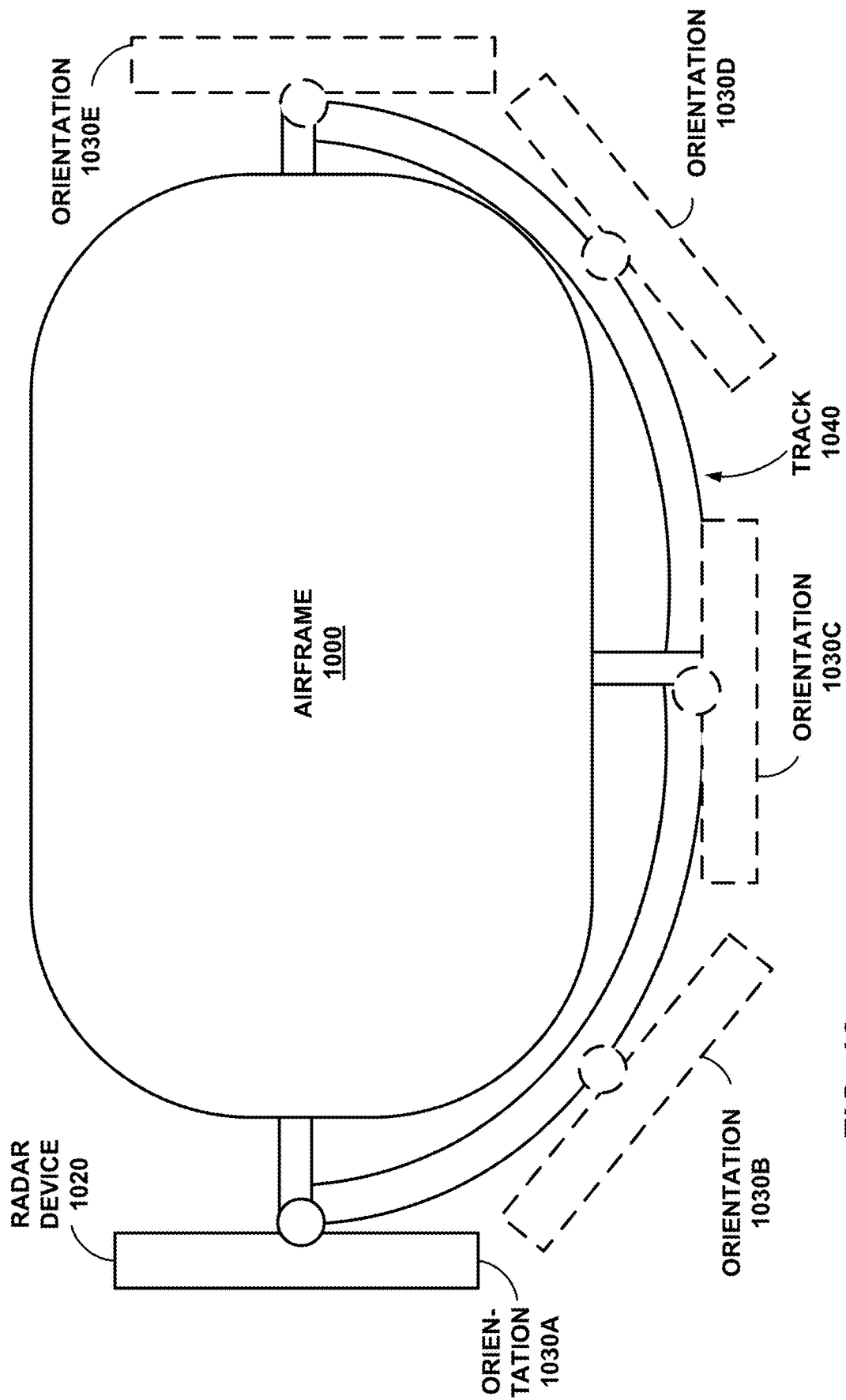
FIG. 10 is a conceptual block diagram depicting five orientations for a radar device, in accordance with some examples of this disclosure.

FIG. 10 is a conceptual block diagram depicting five orientations for a radar device, in accordance with some examples of this disclosure. Track 1040 may be configured to position radar device 1020 in a forward orientation 1030A, an aft orientation 1030E, a downward orientation 1030C, or intermediate orientations 1030B and 1030D.

Figure 11:
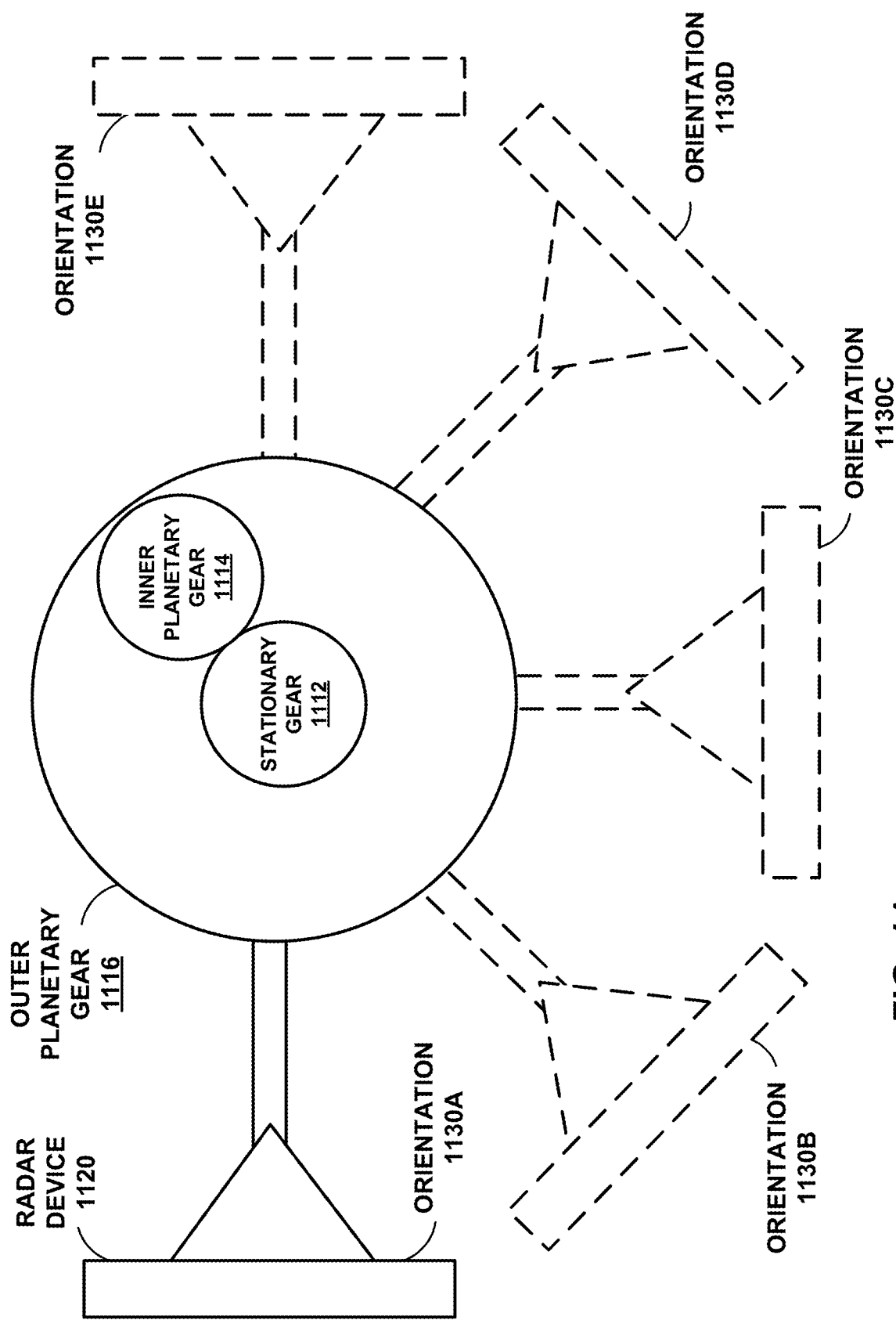
FIG. 11 is a conceptual block diagram depicting a planetary gearset for positioning a radar device, in accordance with some examples of this disclosure.

FIG. 11 is a conceptual block diagram depicting a planetary gearset for positioning a radar device 1120, in accordance with some examples of this disclosure. Outer planetary gear 1116 may be configured to control the orientation of radar device 1120. Inner planetary gear 1114 may be configured to rotate inside outer planetary gear 1116. Stationary gear 1112 may be configured to cause outer planetary gear 1116 to rotate. A stationary motor may be configured to drive stationary gear 1112 to cause the rotation of planetary gear 1116. The planetary gearset of FIG. 11 and the track devices of FIGS. 9 and 10 are examples of mechanical elements that may be configured to position a radar system in different orientations.

Figure 12:
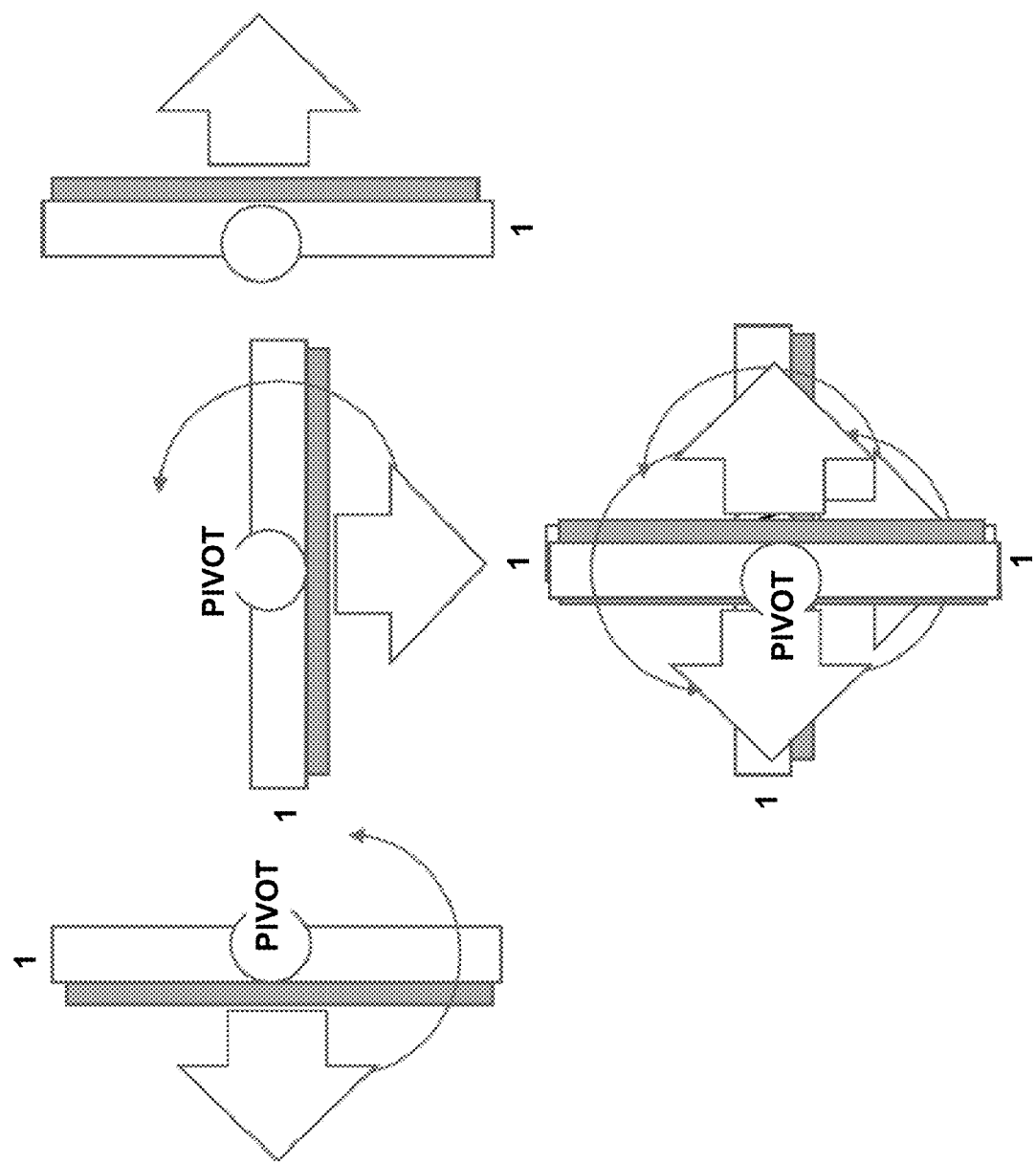
FIG. 12 is a conceptual block diagram depicting forward, altimeter, and aft pivot positions, in accordance with some examples of this disclosure.

FIG. 12 is a conceptual block diagram depicting forward, altimeter, and aft pivot positions, in accordance with some examples of this disclosure. A mechanical element may be configured to pivot the radar system in three or more different positions so that the radar system can detect obstacles and determine an estimated altitude.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry 110 and/or 210 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

The radar systems of FIGS. 1-6B may include one or more memory devices that include any volatile or non-volatile media, such as a RAM, ROM, non-volatile RAM (NVRAM), electrically erasable programmable ROM (EE-PROM), flash memory, and the like. The one or more memory devices may store computer readable instructions that, when executed by processing circuitry 110 or 210, cause the processing circuitry to implement the techniques attributed herein to processing circuitry.

Elements of processing circuitry 110 and/or 210 may be programmed with various forms of software. The processing circuitry 110 and/or 210 may be implemented at least in part as, or include, one or more executable applications, application modules, libraries, classes, methods, objects, routines, subroutines, firmware, and/or embedded code, for example. Elements of the processing circuitry 110 and/or 210 as in any of the examples herein may be implemented as a device, a system, an apparatus, and may embody or implement a method of receiving surveillance signals and predicting future vehicle maneuvers.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, a ballistic vehicle, or automated cargo or parcel delivery drone or other craft).

The following numbered examples demonstrate one or more aspects of the disclosure.

Example 1

A radar system includes PLL circuitry configured to generate a control voltage signal and processing circuitry configured to generate a reference signal to drive the PLL circuitry to generate the control voltage signal. The radar system also includes VCO circuitry configured to generate RF signals based on the control voltage signal and one or more antennas configured to transmit the RF signals and receive returned RF signals. The radar system further includes receiver circuitry configured to generate IF signals based on the returned RF signals, wherein the processing circuitry is further configured to detect an object based on the IF signals.

Example 2

The radar system of example 1, further including a panel including the one or more antennas, wherein the one or more antennas include one or more transmit antennas configured to transmit the RF signals and four quadrants of receive antennas, wherein each quadrant of the four quadrants includes at least four receive antennas arranged in a substantially square format. The receive antennas are configured to receive the returned RF signals and deliver the returned RF signals to the receiver circuitry.

Example 3

The radar system of examples 1-2 or any combination thereof, further including a case enclosing the PLL circuitry, the VCO circuitry, the one or more antennas, the receiver circuitry, and the processing circuitry, wherein a longest dimension of the case is less than twenty centimeters, and wherein a second-longest dimension of the case is less than ten centimeters.

Example 4

The radar system of examples 1-3 or any combination thereof, further including an analog-to-digital converter configured to generate digital signals based on the IF signals, wherein the processing circuitry is configured to detect the object based on the digital signals.

Example 5

The radar system of examples 1-4 or any combination thereof, wherein the radar system is configured to operate in only one frequency band.

Example 6

The radar system of examples 1-5 or any combination thereof, further including an LO and a coupler configured to deliver the RF signals to a transmit antenna and deliver the RF signals to the LO, wherein the LO is configured to deliver an LO signal to the receiver circuitry based on the RF signals.

Example 7

The radar system of examples 1-6 or any combination thereof, further including a PCB, wherein the PLL circuitry, the processing circuitry, the VCO circuitry, and the receiver circuitry are mounted on the PCB. The radar system also includes an LO mounted on the PCB and configured to generate an LO signal and deliver the LO signal to the receiver circuitry. The radar system further includes a coupler on the PCB configured to couple the RF signals to the LO, wherein the LO is configured to generate the LO signal based on the coupled RF signals.

Example 8

The radar system of examples 1-7 or any combination thereof, wherein the receiver circuitry includes a mixer configured to generate two IF signals based on the returned RF signals and a local oscillator signal. The receiver circuitry also includes two IF amplifiers configured to filter the two IF signals into filtered IF signals and an analog-to-digital converter configured to generate digital signals based on the filtered IF signals, wherein the processing circuitry is configured to detect the object based on the digital signals.

Example 9

The radar system of examples 1-8 or any combination thereof, wherein the processing circuitry is configured to drive the PLL circuitry to operate in a continuous wave mode.

Example 10

The radar system of examples 1-9 or any combination thereof, wherein the processing circuitry is configured to detect a velocity of the object based on the IF signals.

Example 11

The radar system of examples 1-10 or any combination thereof, further including a crystal oscillator configured to operate as a master clock for the processing circuitry and the PLL circuitry.

Example 12

The radar system of examples 1-11 or any combination thereof, wherein the VCO circuitry is further configured to generate a divided RF signal, and wherein the PLL circuitry is further configured to generate a multiplied signal by multiplying a frequency of the reference signal and compare the multiplied signal and the divided RF signal. The PLL circuitry is configured to generate the control voltage signal based on comparing the multiplied signal and the divided RF signal.

Example 13

The radar system of examples 1-12 or any combination thereof, wherein the radar system is configured to mount on a vehicle, and wherein the processing circuitry is further configured to determine an estimated altitude of the vehicle based on the IF signals.

Example 14

The radar system of examples 1-13 or any combination thereof, wherein the radar system is configured to mount on a vehicle, and wherein the processing circuitry is further configured to determine at least two receive beams of returned RF signals and measure Doppler shift of the at least two receive beams, wherein the processing circuitry is configured to determine an estimated velocity of the vehicle based on the Doppler shift of the at least two receive beams.

Example 15

A method includes driving, at processing circuitry, PLL circuitry to generate a control voltage signal and generating, at VCO circuitry, RF signals based on the control voltage signal. The method also includes transmitting, at one or more antennas, the RF signals and receiving, at the one or more antennas, returned RF signals. The method further includes generating, at receiver circuitry, IF signals based on the returned RF signals and detecting, at the processing circuitry, an object based on the IF signals.

Example 16

The method of example 15, wherein receiving the returned RF signals includes receiving, at four quadrants of receive antennas, the returned RF signals, wherein generating IF signals includes generating, at four mixers, the IF signals, wherein the method further includes filtering, at four IF amplifiers, IF signals into filtered IF signals, and wherein detecting the object is further based on the filtered IF signals.

Example 17

The method of examples 15-16 or any combination thereof, further including generating, at an analog-to-digital converter, digital signals based on the IF signals, wherein detecting the object is further based on the digital signals.

Example 18

The method of examples 15-17 or any combination thereof, further including generating, at an analog-to-digital converter, digital signals based on the IF signals, wherein detecting the object is further based on the digital signals.

Example 19

The method of examples 15-18 or any combination thereof, wherein transmitting the RF signals includes transmitting, at the one or more antennas, the RF signals in only one frequency band.

Example 20

The method of examples 15-19 or any combination thereof, further including delivering, by a coupler, the RF signals to the one or more antennas; delivering, by the coupler, the RF signals to an LO; and delivering, by the LO, an LO signal to the receiver circuitry based on the RF signals.

Example 21

The method of examples 15-20 or any combination thereof, wherein generating the RF signals includes generating, at the VCO circuitry, the RF signals in a continuous wave mode.

Example 22

A radar system includes PLL circuitry configured to generate a control voltage signal and processing circuitry configured to drive the PLL circuitry to generate the control voltage signal. The radar system also includes VCO circuitry configured to generate RF signals in a continuous wave mode based on the control voltage signal and one or more transmit antennas configured to transmit the RF signals. The radar system further includes an LO configured to generate an LO signal based on the RF signals, a coupler configured to deliver the RF signals to the one or more transmit antennas and to the LO, and four quadrants of receive antennas configured to receive returned RF signals. The radar system includes four mixers configured to generate IF signals based on the returned RF signals and based on the LO signal, four IF amplifiers configured to filter the IF signals, and four analog-to-digital converters configured to generate digital signals based on the filtered IF signals, wherein the processing circuitry is further configured to detect an object based on the digital signals.

Example 23

The radar system of example 22, further including a memory device, wherein the processing circuitry is configured to detect the object by at least determining a location of the object based on the returned RF signals and determining a velocity of the object based on the returned RF signals. The processing circuitry is further configured to store the location of the object to the memory device and store the velocity of the object to the memory device.

Example 24

A system is configured to be mounted on a vehicle, the system including one or more phased-array radar devices configured to transmit first radar signals, receive first returned radar signals, transmit second radar signals, and receive second returned radar signals. The system also includes processing circuitry configured to detect an object based on the first returned radar signals and determine an estimated altitude of the vehicle above a ground surface based on the second returned radar signals.

Example 25

The radar system of example 24, wherein the one or more phased-array radar devices includes a single phased-array radar device, and the system further includes a mechanical element configured to position the single phased-array radar device in a first orientation relative to the vehicle and position the single phased-array radar device in a second orientation relative to the vehicle. The single phased-array radar device is configured to transmit the first radar signals while the single phased-array radar device is positioned in the first orientation, receive the first returned radar signals while the single phased-array radar device is positioned in the first orientation, transmit the second radar signals while the single phased-array radar device is positioned in the second orientation, and receive the second returned radar signals while the single phased-array radar device is positioned in the first orientation.

Example 26

The method of examples 24-25 or any combination thereof, wherein the mechanical element is configured to position the single phased-array radar device in the first orientation by at least pointing the antenna array of the single phased-array radar device at an angle that is approximately parallel to a direction of movement of the vehicle. The mechanical element is configured to position the single phased-array radar device in the second orientation by at least pointing an antenna array of the single phased-array radar device towards the ground surface.

Example 27

The method of examples 24-26 or any combination thereof, wherein the mechanical element is further configured to position the single phased-array radar device in a third orientation by at least pointing the antenna array of the single phased-array radar device at an angle that is approximately parallel to a direction of movement of the vehicle and pointing in an opposite direction of the first orientation. The single phased-array radar device is configured to transmit the first radar signals while the single phased-array radar device is positioned in the third orientation and receive the first returned radar signals while the single phased-array radar device is positioned in the third orientation.

Example 28

The method of examples 24-27 or any combination thereof, wherein the mechanical element is further configured to position the single phased-array radar device in an intermediate orientation by at least pointing the antenna array of the single phased-array radar device at an angle that is between the first orientation and the second orientation.

Example 29

The method of examples 24-28 or any combination thereof, wherein the mechanical element includes a planetary gearset including an outer planetary gear configured to control an orientation of the single phased-array radar device, an inner planetary gear configured to rotate inside the outer planetary gear, and a stationary motor and stationary gear configured to cause the outer planetary gear to rotate.

Example 30

The method of examples 24-29 or any combination thereof, wherein the one or more phased-array radar devices includes a first phased-array radar device and a second phased-array radar device. The first phased-array radar device includes an antenna array pointed approximately parallel to a direction of movement of the vehicle and configured to transmit the first radar signals and receive the first returned radar signals. The second phased-array radar device includes an antenna array pointed towards the ground surface and configured to transmit the second radar signals and receive the second returned radar signals.

Example 31

The method of examples 24-30 or any combination thereof, wherein the processing circuitry is further configured to determine at least two receive beams on receive towards the ground surface based on the returned signals and determine a distance to the ground surface based on the at least two receive beams.

Example 32

The method of examples 24-31 or any combination thereof, wherein the processing circuitry is further configured to measure Doppler shift of the at least two receive beams, and wherein the processing circuitry is configured to determine an estimated velocity of the vehicle based on the Doppler shift of the at least two receive beams.

Example 33

The method of examples 24-31 or any combination thereof, wherein the processing circuitry is further configured to determine at least four receive beams towards the ground surface based on the returned signals and determine a distance to the ground surface based on the at least four receive beams.

Various illustrative aspects of the disclosure are described above. These and other aspects are within the scope of the following claims.

What is claimed is:

1. A radar system comprising:
   phase-locked loop (PLL) circuitry configured to generate a control voltage signal;
   processing circuitry configured to generate a reference signal to drive the PLL circuitry to generate the control voltage signal;
   voltage-controlled oscillator (VCO) circuitry configured to generate radio-frequency (RF) signals based on the control voltage signal;
   a panel including:
     one or more transmit antennas configured to transmit the RF signals; and
     four quadrants of receive antennas, wherein each quadrant of the four quadrants includes at least four receive antennas arranged in a substantially square format, wherein the receive antennas are configured to receive returned RF signals; and
   receiver circuitry configured to generate intermediate-frequency (IF) signals based on the returned RF signals,
   wherein the receive antennas are further configured to deliver the returned RF signals to the receiver circuitry, and
   wherein the processing circuitry is further configured to detect an object based on the IF signals.

2. The radar system of claim 1, further comprising a case enclosing the PLL circuitry, the VCO circuitry, the panel, the receiver circuitry, and the processing circuitry,
   wherein a longest dimension of the case is less than twenty centimeters, and
   wherein a second-longest dimension of the case is less than ten centimeters.

3. The radar system of claim 1, further comprising an analog-to-digital converter configured to generate digital signals based on the IF signals, wherein the processing circuitry is configured to detect the object based on the digital signals.

4. The radar system of claim 1, wherein the radar system is configured to operate in only one frequency band.

5. The radar system of claim 1, further comprising:
   a local oscillator (LO); and
   a coupler configured to:
     deliver the RF signals to the one or more transmit antennas; and
     deliver the RF signals to the LO,
   wherein the LO is configured to deliver an LO signal to the receiver circuitry based on the RF signals.

6. The radar system of claim 1, further comprising:
   a printed circuit board (PCB), wherein the PLL circuitry, the processing circuitry, the VCO circuitry, and the receiver circuitry are mounted on the PCB;
   a local oscillator (LO) mounted on the PCB and configured to:
     generate an LO signal; and
     deliver the LO signal to the receiver circuitry; and
   a coupler on the PCB configured to couple the RF signals to the LO,
   wherein the LO is configured to generate the LO signal based on the coupled RF signals.

7. The radar system of claim 1, wherein the receiver circuitry comprises:
   a mixer configured to generate two IF signals based on the returned RF signals and a local oscillator signal;
   two IF amplifiers configured to filter the two IF signals into filtered IF signals; and
   an analog-to-digital converter configured to generate digital signals based on the filtered IF signals, wherein the processing circuitry is configured to detect the object based on the digital signals.

8. The radar system of claim 1, wherein the processing circuitry is configured to drive the PLL circuitry to operate in a continuous wave mode.

9. The radar system of claim 1, wherein the processing circuitry is configured to detect a velocity of the object based on the IF signals.

10. The radar system of claim 1, further comprising a crystal oscillator configured to operate as a master clock for the processing circuitry and the PLL circuitry.

11. The radar system of claim 1, wherein the VCO circuitry is further configured to generate a divided RF signal, and wherein the PLL circuitry is further configured to:
generate a multiplied signal by multiplying a frequency of the reference signal; and
compare the multiplied signal and the divided RF signal, wherein the PLL circuitry is configured to generate the control voltage signal based on comparing the multiplied signal and the divided RF signal.

12. The radar system of claim 1, wherein the radar system is configured to mount on a vehicle, and wherein the processing circuitry is further configured to determine an estimated altitude of the vehicle based on the IF signals.

13. The radar system of claim 1, wherein the radar system is configured to mount on a vehicle, and wherein the processing circuitry is further configured to:
determine at least two receive beams of the returned RF signals; and
measure Doppler shift of the at least two receive beams, wherein the processing circuitry is configured to determine an estimated velocity of the vehicle based on the Doppler shift of the at least two receive beams.

14. A method comprising:
driving phase-locked loop (PLL) circuitry to generate a control voltage signal;
generating, at voltage-controlled oscillator (VCO) circuitry, radio-frequency (RF) signals based on the control voltage signal;
transmitting, at one or more transmit antennas, the RF signals;
receiving, at four quadrants of receive antennas, returned RF signals;
generating, at four mixers of receiver circuitry, intermediate-frequency (IF) signals based on the returned RF signals;
filtering, at four IF amplifiers, IF signals into filtered IF signals; and
detecting an object based on the filtered IF signals.

15. The method of claim 14, wherein transmitting the RF signals comprises transmitting, at the one or more transmit antennas, the RF signals in only one frequency band.

16. The method of claim 14, wherein detecting the object comprises detecting a velocity of the object based on the IF signals.

17. A radar system comprising:
phase-locked loop (PLL) circuitry configured to generate a control voltage signal;
processing circuitry configured to drive the PLL circuitry to generate the control voltage signal;
voltage-controlled oscillator (VCO) circuitry configured to generate radio-frequency (RF) signals in a continuous wave mode based on the control voltage signal;
one or more transmit antennas configured to transmit the RF signals;
a local oscillator (LO) configured to generate an LO signal based on the RF signals;
a coupler configured to deliver the RF signals to the one or more transmit antennas and to the LO;
four quadrants of receive antennas configured to receive returned RF signals;
four mixers configured to generate intermediate-frequency (IF) signals based on the returned RF signals and based on the LO signal;
four IF amplifiers configured to filter the IF signals; and
four analog-to-digital converters configured to generate digital signals based on the filtered IF signals,
wherein the processing circuitry is further configured to detect an object based on the digital signals.

18. The radar system of claim 17, further comprising a memory device, wherein the processing circuitry is configured to detect the object by at least:
determining a location of the object based on the returned RF signals; and
determining a velocity of the object based on the returned RF signals,
wherein the processing circuitry is further configured to:
store the location of the object to the memory device; and
store the velocity of the object to the memory device.

19. The radar system of claim 17, further comprising a case enclosing the PLL circuitry, the VCO circuitry, the one or more transmit antennas, the four quadrants of receive antennas, the LO, the coupler, the four mixers, the four IF amplifiers, the four analog-to-digital converters, and the processing circuitry,
wherein a longest dimension of the case is less than twenty centimeters, and
wherein a second-longest dimension of the case is less than ten centimeters.

20. The radar system of claim 17,
wherein the radar system is configured to mount on a vehicle, and
wherein the processing circuitry is further configured to determine an altitude of the vehicle above a ground surface based on the digital signals.

* * * * *